US009873252B2

(12) United States Patent
Gotou

(10) Patent No.: US 9,873,252 B2
(45) Date of Patent: Jan. 23, 2018

(54) PRINTING DEVICE AND PRINTING METHOD

(71) Applicant: Hiroshi Gotou, Shizuoka (JP)

(72) Inventor: Hiroshi Gotou, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/388,653

(22) Filed: Dec. 22, 2016

(65) Prior Publication Data

US 2017/0182770 A1    Jun. 29, 2017

(30) Foreign Application Priority Data

Dec. 25, 2015   (JP) .................................. 2015-255245
Apr. 13, 2016   (JP) .................................. 2016-080510

(51) Int. Cl.
*B41J 2/14*            (2006.01)

(52) U.S. Cl.
CPC .................................. *B41J 2/1433* (2013.01)

(58) Field of Classification Search
CPC ........................... B41J 21/1433; B41J 21/1606
See application file for complete search history.

(56) References Cited

U.S. PATENT DOCUMENTS

| 8,814,340 B2 | 8/2014 | Goto |
| 8,980,408 B2 | 3/2015 | Gotou et al. |
| 8,998,400 B2 | 4/2015 | Harada et al. |
| 9,033,484 B2 | 5/2015 | Fujii et al. |
| 9,062,217 B2 | 6/2015 | Gotou et al. |
| 9,169,416 B2 | 10/2015 | Gotou |
| 2009/0041940 A1 | 2/2009 | Yokohama et al. |
| 2011/0050785 A1 | 3/2011 | Sawada |
| 2011/0318543 A1 | 12/2011 | Goto |
| 2013/0307912 A1* | 11/2013 | Masuda ................. C09D 11/38 347/100 |
| 2013/0323474 A1 | 12/2013 | Gotou et al. |
| 2014/0002539 A1 | 1/2014 | Goto et al. |

(Continued)

FOREIGN PATENT DOCUMENTS

| JP | 2763410 | 3/1998 |
| JP | 10-202887 A | 8/1998 |

(Continued)

OTHER PUBLICATIONS

Extended European Search Report dated Apr. 26, 2017 in European Patent Application No. 16206815.9.
U.S. Appl. No. 15/189,673, filed Jun. 22, 2016.

*Primary Examiner* — Juanita D Jackson
(74) *Attorney, Agent, or Firm* — Oblon, McClelland, Maier & Neustadt, L.L.P.

(57) ABSTRACT

A printing device including an inkjet head including a nozzle plate, where the printing device is configured to eject an ink from the inkjet head and the ink includes a colorant, at least one organic solvent, and water, wherein a dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $$10.0\% \leq [(A-B)/(A+B)] \times 100 \leq 19.0\%, \text{ and}$$

wherein a receding contact angle of the ink relative to the nozzle plate is 35° or greater.

11 Claims, 6 Drawing Sheets

(56) References Cited

U.S. PATENT DOCUMENTS

| | | | |
|---|---|---|---|
| 2014/0063156 A1* | 3/2014 | Boris | ............... C09D 11/10 347/100 |
| 2015/0079358 A1 | 3/2015 | Gotou et al. | |
| 2015/0103116 A1 | 4/2015 | Gotou | |
| 2015/0283828 A1 | 10/2015 | Aoai et al. | |
| 2016/0185110 A1 | 6/2016 | Masuda et al. | |
| 2016/0222234 A1 | 8/2016 | Matsuyama et al. | |
| 2016/0333208 A1 | 11/2016 | Gotou et al. | |

FOREIGN PATENT DOCUMENTS

| | | |
|---|---|---|
| JP | 2012-207202 | 10/2012 |
| JP | 2013-248763 | 12/2013 |
| JP | 2013-256108 | 12/2013 |
| JP | 2014-094998 | 5/2014 |
| JP | 2015-136804 | 7/2015 |
| WO | WO 2015/034027 A1 | 3/2015 |

\* cited by examiner

PRINTING DEVICE AND PRINTING METHOD

CROSS-REFERENCE TO RELATED APPLICATIONS

The present application claims priority under 35 U.S.C. §119 to Japanese Patent Application No. 2015-255245, filed Dec. 25, 2015 and Japanese Patent Application No. 2016-080510, filed Apr. 13, 2016. The contents of which are incorporated herein by reference in their entirety.

BACKGROUND OF THE INVENTION

Field of the Invention

The present disclosure relates to printing devices and printing methods.

Description of the Related Art

As printing devices, such as printers, facsimiles, photocopiers, plotters, and multifunction peripherals of the foregoing devices, for example, inkjet printing devices including inkjet heads have been known.

As inks for use in the inkjet printing devices, aqueous pigment inks, in each of which a pigment is dispersed in a water in the form of particles, have been attracted attentions. Since the pigment has a similar composition to that of a colorant used in a typical commercial printing ink, it is expected that printed matter printed with the ink achieves the quality similar to commercial printing. When printing is performed on coat sheets for commercial printing or publication printing with the aqueous pigment ink, however, absorption of the ink is not prompt enough to thereby cause beading.

Accordingly, the applicant previously proposed inkjet printing inks each including an aqueous organic solvent, a surfactant, and a colorant (see, for example, Japanese Unexamined Patent Application Publication Nos. 2012-207202 and 2014-94998). Multivalent alcohol having an equilibrium moisture content of 30% by mass or greater at a temperature of 23° C. and relative humidity of 80% and a certain amide compound are used as the water-soluble organic solvent. Moreover, at least one selected from the group consisting of a silicone-based surfactant, a fluorine-based surfactant, and an acetylene glycol-based surfactant is used as the surfactant.

SUMMARY OF THE INVENTION

According to one aspect of the present disclosure, a printing device includes an inkjet head including a nozzle plate. The printing device is configured to eject an ink from the inkjet head and the ink includes a colorant, at least one organic solvent, and water. A dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $$10.0\% \leq [(A-B)/(A+B)] \times 100 \leq 19.0\%.$$

A receding contact angle of the ink relative to the nozzle plate is 35° or greater.

Figure 1:
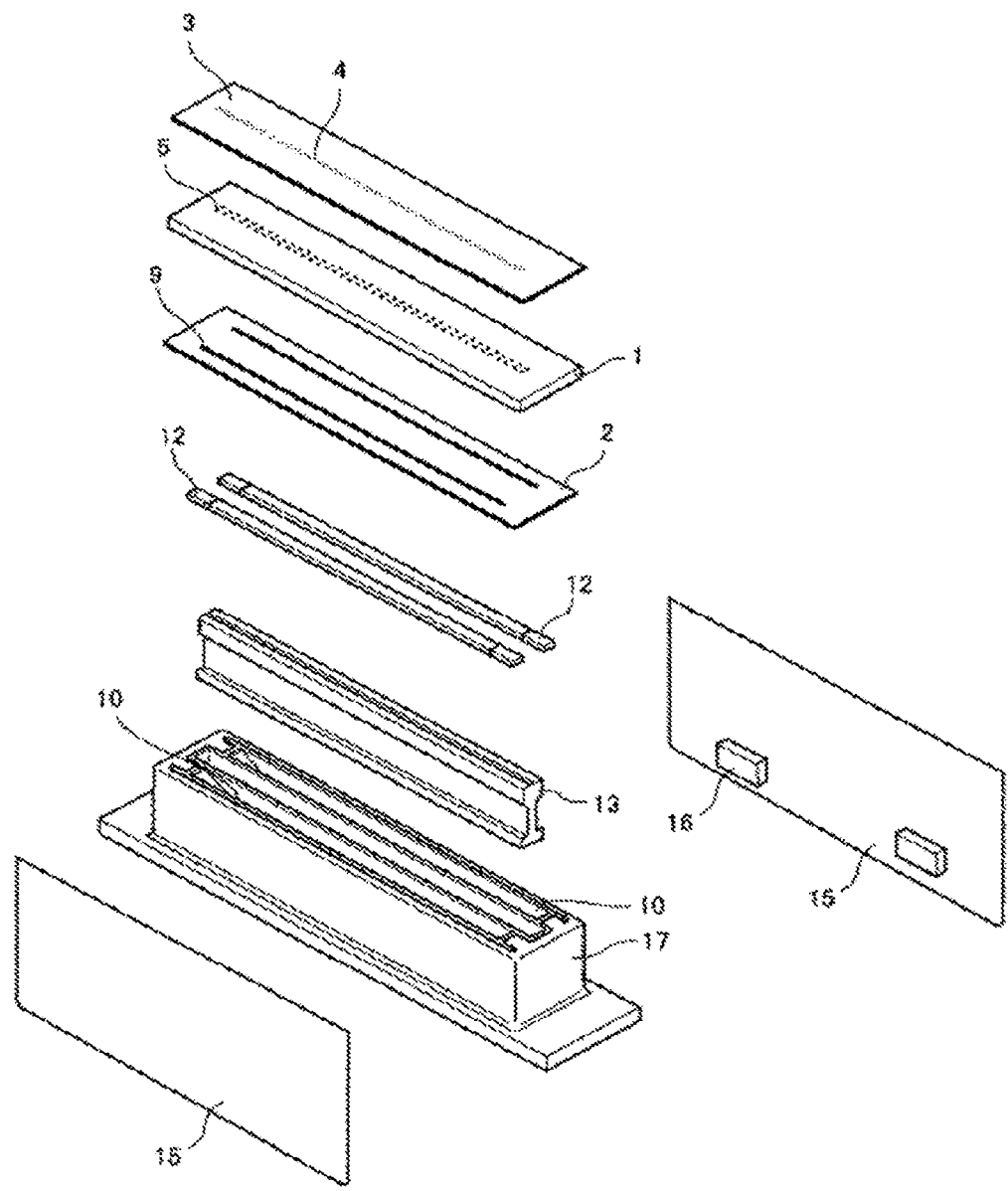
FIG. 1 is an exploded perspective view illustrating one example of an inkjet head for use in the present disclosure.

DESCRIPTION OF THE EMBODIMENTS (Printing Device and Printing Method)

A printing device of the present disclosure includes an inkjet head including a nozzle plate, and may further include other members according to the necessity.

The printing device is configured to eject an ink from the inkjet head and the ink includes a colorant, at least one organic solvent, and water.

A dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $$10.0\% \leq [(A-B)/(A+B)] \times 100 \leq 19.0\%.$$

A receding contact angle of the ink relative to the nozzle plate is 35° or greater.

A printing method of the present disclosure includes ejecting an ink from an inkjet head including a nozzle plate, where the ink includes a colorant, at least one organic solvent, and water.

A dynamic surface tension A of the ink at 25° C. with a surface lifetime of 15 msec as measured by the maximum bubble pressure method is 34.0 mN/m or less, and the dynamic surface tension A and a static surface tension B of the ink at 25° C. satisfy a formula below, $$10.0\% \leq [(A-B)/(A+B)] \times 100 \leq 19.0\%.$$

A receding contact angle of the ink relative to the nozzle plate is 35° or greater.

The printing device and printing method of the present disclosure have accomplished based on insights below. Namely, a relationship between a dynamic surface tension of an ink in the art with a surface lifetime of 15 msec as measured by the maximum bubble pressure method and a static surface tension of the ink is not optimized, and therefore an ink-repellent film of a nozzle plate of an inkjet head is easily wet with the ink, and ejection stability is impaired by deposition of the ink on the nozzle.

The present disclosure has an object to provide a printing device, which enables high quality printing on general-purpose printing sheets, as well as plane sheets, with preventing beading, and achieves excellent image density and ejection stability.

The present disclosure can provide a printing device, which enables high quality printing on general-purpose printing sheets, as well as plane sheets, with preventing beading, and achieves excellent image density and ejection stability.

<Inkjet Head>

The inkjet head includes a nozzle plate, and may further include other members according to the necessity.

—Nozzle Plate—

The nozzle plate includes a nozzle substrate and an ink-repellent film disposed on the nozzle substrate.

—Nozzle Substrate—

Nozzle holes are disposed in the nozzle substrate, and the number of nozzle holes, shapes and sizes of the nozzle holes, a material and structure of the nozzle substrate are is not particularly limited and may be appropriately selected depending on the intended purpose.

The nozzle substrate has a surface at an ink ejection side from which the ink is ejected through the nozzle holes, and a liquid chamber contact surface at an opposite side to the surface of the ink ejection side.

The ink-repellent film is formed on the surface of the nozzle substrate at the ink ejection side.

A flat shape of the nozzle substrate is not particularly limited and may be appropriately selected depending on the intended purpose. Examples of the flat shape include a rectangle, a square, a diamond, a circle, and an oval. Moreover, examples of a cross-sectional shape of the nozzle substrate include a flat board shape, and a plate shape.

A size of the nozzle substrate is not particularly limited and can be appropriately selected depending on a size of the nozzle plate.

A material of the nozzle substrate is not particularly limited and may be appropriately selected depending on the intended purpose. Examples of the material of the nozzle substrate include stainless steel, Al, Bi, Cr, InSn, ITO, Nb, $Nb_2O_5$, NiCr, Si, $SiO_2$, Sn, $Ta_2O_5$, Ti, W, ZAO (ZnO+ $Al_2O_3$), and Zn. The above-listed examples may be used alone or in combination. Among the above-listed examples, stainless steel is preferable in view of rust resistance.

The stainless steel is not particularly limited and may be appropriately selected depending on the intended purpose. Examples of the stainless steel include austenitic stainless steel, ferritic stainless steel, martensitic stainless steel, and precipitation hardening stainless steel. The above-listed examples may be used alone or in combination.

At least a surface of the nozzle substrate at the ink ejection side may be subjected to an oxygen plasma treatment to introduce hydroxyl groups in order to improve adhesion between the ink-repellent film and the nozzle substrate.

—Nozzle Hole—

The number, arrangement, pitch, opening shapes, opening sizes, and opening cross-sectional shapes of the nozzle holes are is not particularly limited and may be appropriately selected depending on the intended purpose.

The arrangement of the nozzle holes is not particularly limited and may be appropriately selected depending on the intended purpose. Examples of the arrangement include an embodiment where the nozzle holes are arranged along a length direction of the nozzle substrate at an even pitch.

An arrangement of the nozzle holes is appropriately selected depending on a type of an ink to be ejected. The arrangement is preferably from 1 line through a plurality of lines, and more preferably from 1 line through 4 lines.

The number of the nozzle holes per line is not particularly limited and may be appropriately selected depending on the intended purpose. The number of the nozzle holes per line is preferably 10 or greater but 10,000 or less, and more preferably 50 or greater but 500 or less.

A gap (pitch) P that is a minimum distance between centers of the adjacent nozzle holes is not particularly limited and may be appropriately selected depending on the intended purpose. For example, the pitch P is preferably 21 μm or greater but 169 μm or less.

An opening shape of the nozzle hole is not particularly limited and may be appropriately selected depending on the intended purpose. Examples of the opening shape include a circle, an oval, and a square. Among the above-listed examples, a circle is preferable in view of ejection of ink droplets.

—Ink-Repellent Film—

The ink-repellent film preferably include a fluorine-containing acrylate polymer, or a polymer having a fluorine-containing heterocyclic structure in a main chain of the polymer.

Since the ink-repellent film includes the fluorine-containing acrylate polymer or the polymer having a fluorine-containing heterocyclic structure in a main chain of the polymer, surface free energy becomes extremely small, and a state where it is difficult to wet with an ink having a low surface tension for use in the present disclosure can be maintained. Therefore, the above-mentioned ink-repellent film is preferable. In the case where another material is used as the ink-repellent film, however, surface free energy becomes extremely small, and therefore the ink-repellent film may be wet with an ink having a low surface tension for use in the present disclosure.

—Fluorine-Containing Acrylate Polymer—

The fluorine-containing acrylate polymer preferably includes a monomer unit which is at least one selected from the group consisting of a compound represented by General Formula (III) below and a compound represented by General Formula (IV) below.

[General Formula (III)]

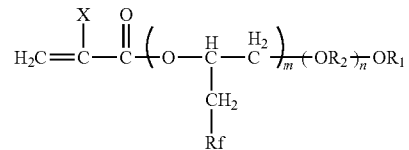

[General Formula (IV)]

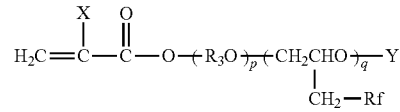

In General Formulae (III) and (IV), X is a hydrogen atom, a straight-chain or branched-chain alkyl group containing from 1 through 21 carbon atoms, a halogen atom, a $CFX_1X_2$ group (where $X_1$ and $X_2$ are each independently a hydrogen atom or a halogen atom), a cyano group, a straight-chain or branched-chain fluoroalkyl group containing from 1 through 21 carbon atoms, a substituted or unsubstituted benzyl group, or a substituted or unsubstituted phenyl group; $R_1$ is an alkyl group containing from 1 through 18 carbon atoms; $R_2$ is an alkylene group containing from 2 through 6 carbon atoms; $R_3$ is an alkylene group containing from 2 through 6 carbon atoms; Y is an acid group; Rf is a straight-chain or branched-chain fluoroalkyl group containing from 1 through 21 carbon atoms; m is from 1 through 10; n is from 2 through 90; p is from 1 through 90; and q is from 1 through 10.

The number of carbon atoms of $R_1$ is preferably from 1 through 18 and more preferably from 1 through 4. Examples of $R_1$ include a methyl group, an ethyl group, a propyl group, a butyl group, a pentyl group, a hexyl group, a heptyl group, an octyl group, a nonyl group, a decyl group, and an undecyl group.

$R_2$ is an alkylene group containing from 2 through 6 carbon atoms, and examples of $R_2$ include an ethylene group, a propylene group, and a butylene group. Among the above-listed examples, an ethylene group is preferable.

$R_3$ is an alkylene group containing from 2 through 6 carbon atoms, and examples of $R_3$ include an ethylene group, a propylene group, and a butylene group. Among the above-listed examples, an ethylene group is preferable.

Y is an acid group, and examples of Y include a sulfonic acid group, a succinic acid group, an acetic acid group, a phthalic acid group, a hydrogenated phthalic acid group, and a maleic acid group.

Rf is a straight-chain or branched-chain fluoroalkyl group containing from 1 through 21 carbon atom, and preferably a perfluoroalkyl group. The number of carbon atoms of Rf is more preferably from 1 through 10.

Examples of Rf include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_3$, —$(CF_2)_5CF_3$, —$(CF_2)_3CF(CF_3)_2$, —$(CF_2)_4CF(CF_3)_2$, —$(CF_2)_7CF_3$, —$(CF_2)_5CF(CF_3)_2$, —$(CF_2)_6CF(CF_3)_2$, and —$(CF_2)_9CF_3$.

"m" is preferably from 1 through 10 and more preferably from 1 through 3.

"n" is preferably from 2 through 90, more preferably from 3 through 50, and even more preferably from 4 through 30.

"p" is preferably from 1 through 90 and more preferably from 1 through 30.

"q" is preferably from 1 through 10 and more preferably from 1 through 3.

The fluorine-containing acrylate polymer may be appropriately synthesized for use or selected from commercial products.

For example, the fluorine-containing acrylate polymer (Rf is $C_6F_{13}$) represented by General Formula (III) can be synthesized through a reaction formula below.

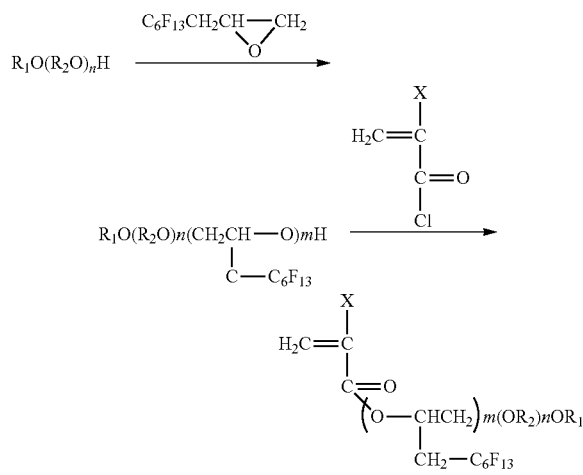

For example, the fluorine-containing acrylate polymer (Rf is $C_6F_{13}$) represented by General Formula (III) can be synthesized through a reaction formula below.

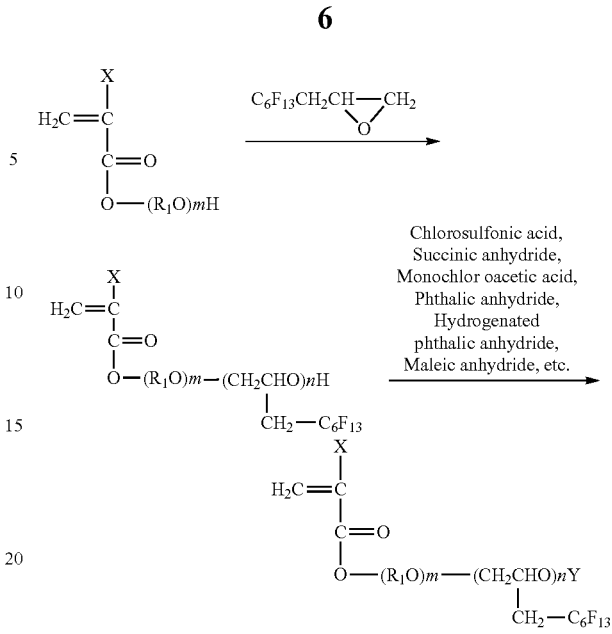

A fluorine content in the fluorine-containing acrylate polymer is preferably 10% by mass or greater, more preferably 25% by mass or greater, and even more preferably 50% by mass or greater in view of ink repellency (contact angle).

Examples of the commercial products include krytox FSL (available from E.I. du Pont de Nemours and Company), krytox FSH (available from E.I. du Pont de Nemours and Company), Fomblin Z (available from Solvay Specialty Polymers Japan K.K.), FLUOROLINK S10 (available from Solvay Specialty Polymers Japan K.K.), OPTOOL DSX (available from DAIKIN INDUSTRIES, LTD.), FLUOROLINK C10 (available from Solvay Specialty Polymers Japan K.K.), MORESCO PHOSFAROL A20H (available from MORESCO Corporation), MORESCO PHOSFAROL ADOH (available from MORESCO Corporation), MORESCO PHOSFAROL DDOH (available from MORESCO Corporation), FLUOROSURF FG5010 (available from Fluoro Technology), FLUOROSURF FG5020 (available from Fluoro Technology), FLUOROSURF FG5060 (available from Fluoro Technology), and FLUOROSURF FG5070 (available from Fluoro Technology).

The ink-repellent film is formed of a film of a compound including the fluorine-containing acrylate polymer skeleton in a molecule of the compound. An inorganic oxide layer may be disposed between the nozzle substrate and the ink-repellent film in order to allow the large number of hydroxyl groups that are to be bonding points with the compound including the fluorine-containing acrylate polymer in a molecular thereof present to thereby improve adhesion.

Examples of a material of the inorganic oxide layer include $SiO_2$, and $TiO_2$.

An average thickness of the inorganic oxide layer is preferably 0.001 µm or greater but 0.2 µm or less, and more preferably 0.01 µm or greater but 0.1 µm or less.

Examples of the compound including the fluorine-containing acrylate polymer skeleton in a molecular thereof include low-molecular-weight materials and resins.

Examples of the compound including the fluorine-containing acrylate polymer skeleton in a molecule thereof include compounds disclosed in Japanese Examined Patent Publication No. 03-43065, and Japanese Unexamined Patent Application Publication Nos. 06-210857, 10-32984, 2000-94567, 2002-145645, 2003-341070, 2007-106024, and 2007-125849.

A particularly preferable example is modified perfluoropolyoxetane (OPTOOL DSX, available from DAIKIN INDUSTRIES, LTD.).

An average thickness of the ink-repellent film is preferably 0.001 μm or greater but 0.2 μm or less, and more preferably 0.01 μm or greater but 0.1 μm or less.

Examples of a formation method of the ink-repellent film using the compound including the fluorine-containing acrylate polymer skeleton in a molecule thereof include coating (e.g., spin coating, roll coating, and dip coating), printing, and vacuum vapor deposition.

Examples of the fluorine-based solvent include NOVEC (available from 3M COMPANY), VERTREL (available from E.I. du Pont de Nemours and Company), and GALDEN (available from Solvay Specialty Polymers Japan K.K.).

—Polymer Having Fluorine-Containing Heterocyclic Structure in Main Chain of Polymer—

Among fluorine-containing polymers having heterocyclic structures, particularly, an amorphous polymer can be used as the polymer having a fluorine-containing heterocyclic structure in a main chain of the polymer. The amorphous polymer can enhance an effect of the present disclosure because the film strength, adhesion to the base, and uniformity of the film are excellent.

As the polymer having a fluorine-containing heterocyclic structure in a main chain of the polymer, for example, polymers disclosed in U.S. Pat. Nos. 3,418,302 and 3,978,030, and Japanese Unexamined Patent Application Publication Nos. 63-238111, 63-238115, 01-131214, and 01-131215 are suitably used.

Among the above-mentioned examples, polymers having the following heterocyclic structures are typical. However, a content of the present disclosure is not limited to the following structures.

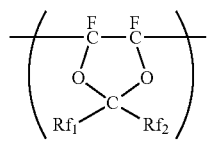
[General Formula (i)]

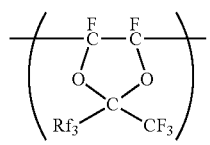
[General Formula (ii)]

In General Formulae (i) and (ii), each of $Rf_1$, $Rf_2$, and $Rf_3$ is a fluorine-containing alkyl group.

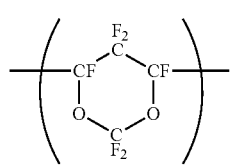
[Structural Formula (i)]

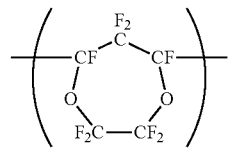
[Structural Formula (ii)]

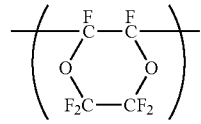
[Structural Formula (iii)]

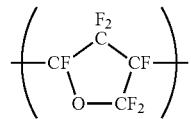
[Structural Formula (iv)]

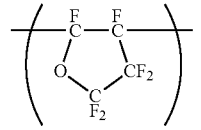
[Structural Formula (v)]

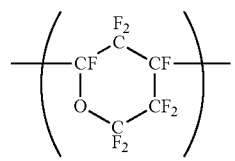
[Structural Formula (vi)]

In order to improve adhesion to a base, and control glass transition temperature (Tg) and solubility to a solvent, moreover, a structure represented by General Formula (iii) below may be introduced into a main chain of the polymer. The structures above can be obtained by copolymerizing with monomers represented by Structural Formulae (vii) to Structural Formula (ix) below.

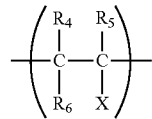
[General Formula (iii)]

In General Formula (iii), each of $R_4$, $R_5$, and $R_6$ is a hydrogen atom, a fluorine atom, a chlorine atom, or $Rf_4$. Note that, $Rf_4$ is a fluorine-containing alkyl group.

X is a hydrogen atom, a fluorine atom, a chlorine atom, $Rf_5$, or $Rf_6$. Note that, $Rf_5$ is a fluorine-containing organic substituent having a terminal functional group, such as acid, ester, alcohol, amine, and amide, and $Rf_6$ is a fluorine-containing alkyl group or a fluorine-containing ether group.

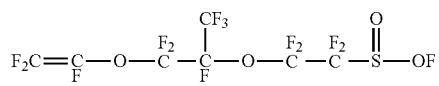
[Structural Formula (vii)]

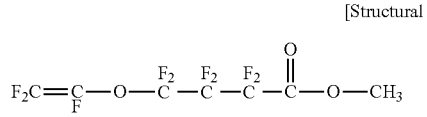
[Structural Formula (viii)]

[Structural Formula (ix)]

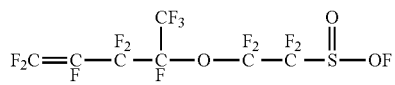

[Structural Formula (x)]

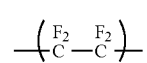

Examples of the polymer having the above-described specific chemical structure and suitable as an ink-repellent processing agent include a product name of CYTOP CTX-105 (available from ASAHI GLASS CO., LTD.), a product name of CYTOP CTX-805 (available from ASAHI GLASS CO., LTD.), a product name of TEFLON (registered trademark) AF1600 and AF2400 (available from E.I. du Pont de Nemours and Company).

Examples of a formation method of the ink-repellent film using the polymer containing fluorine-containing heterocyclic structure in a main chain of the polymer include coating (e.g., spin coating, roll coating, and dip coating), printing, and vacuum vapor deposition.

The fluorine-based solvent is not particularly limited and may be appropriately selected depending on the intended purpose, as long as the fluorine-based solvent is capable of dissolving the polymer having fluorine-containing heterocyclic structure in a main chain of the polymer. For example, the fluorine-based solvent is suitably fluorine-containing solvents, such as perfluorobenzene "product name: AFLUID" (a fluorosolvent available from ASAHI GLASS CO., LTD.), and "product name: FLUORINERT FC-75" (a liquid including perfluoro(2-butyltetrahydrofuran) available from 3M COMPANY). The above-listed examples may be used alone or in combination. In case of a mixed solvent, among the above-listed examples, hydrocarbon-based solvents, hydrocarbon chloride, hydrocarbon fluorochrlodie, alcohols, or other organic solvents can be used in combination.

A concentration of the solution is preferably 0.01% by mass or greater but 50% by mass or less, and more preferably 0.01% by mass or greater but 20% by mass or less.

The object can be sufficiently achieved when an average thickness of the ink-repellent film is 0.01 μm or greater. However, the average thickness is preferably 0.01 μm or greater but 2 μm or less.

A heat treatment condition (temperature) of the polymer having a fluorine-containing heterocyclic structure in a main chain of the polymer is determined based on a boiling point of a solvent, glass transition temperature of the polymer, and heat resistant temperature of the base. Specifically, the heat treatment condition can be selected from temperatures higher than the boiling point of the solvent and glass transition temperature of the polymer but lower than the heat resistant temperature of the base.

Glass transition temperature of the polymer having a fluorine-containing heterocyclic structure in a main chain of the polymer varies depending on the structure thereof. For example, many of the polymers having the structure represented by any of Structural Formulae (iv) to (vi) having glass transition temperature of 50° C. or higher but 110° C. or lower, the heat treatment conditions are preferably a temperature of 120° C. or higher but 170° C. or lower, and a duration of from 30 minutes through 2 hours.

Moreover, a copolymer having a structure represented by General Formula (ii) and a structure represented by Structural Formula (x) below in a main chain of the copolymer is available on market under the trade name of "TEFLON (registered trademark) AF" from E.I. du Pont de Nemours and Company.

The TEFLON (registered trademark) AF can have various glass transition temperatures by varying a copolymerization ratio. Specifically, the glass transition temperature increases, as a ratio of a PDD [perfluoro(2,2-dimethyl-1,3-dioxole)] component increases. The glass transition temperature is in the approximate range of 80° C. or higher but 330° C. or lower depending on the component ratio. The glass transition temperatures of the commercial products are 160° C. (AF1600) and 240° C. (AF2400). For example, the heat treatment temperature of the copolymer having glass transition temperature of 160° C. is preferably 165° C. or higher but 180° C. or lower in view of heat resistant temperature of the base.

—Other Members—

The above-mentioned other members are not particularly limited and may be appropriately selected depending on the intended purpose. Examples of other members include pressurizing chambers and a stimulus generating unit.

—Pressurizing Chambers—

The pressurizing chambers are respectively disposed for the individual nozzle holes arranged in the nozzle plate, and are a plurality of individual flow paths connected to the nozzle holes. The pressurizing chambers are also referred to as ink flow paths, pressurizing liquid chambers, press chambers, ejection chambers, or liquid chambers.

—Stimulus Generating Unit—

The stimulus generating unit is a unit configured to generate stimulus applied to the ink.

The stimulus generated by the stimulus generating unit is not particularly limited and may be appropriately selected depending on the intended purpose. Examples of the stimulus include heat (temperature), pressure, vibration, and light. The above-listed examples may be used alone or in combination. Among the above-listed examples, heat and pressure are suitable.

Examples of the stimulus generating unit include heating devices, press devices, piezoelectric elements, vibration-generating devices, ultrasonic wave oscillators, and lights. Specific examples of the stimulus generating unit include: piezoelectric actuators, such as piezoelectric elements; thermal actuators each utilizing a phase change caused by film boiling of an ink using an electrothermal energy conversion element, such as a heat resistor; shape-memory alloy actuators each utilizing a metal phase change due to a temperature change; and electrostatic actuators each utilizing an electrostatic force.

In the case where the stimulus is "heat," thermal energy corresponding to a printing signal is applied to an ink inside the inkjet head, for example, by means of a thermal head. Bubbles are formed in the ink by the thermal energy, and the ink is ejected as droplets from the nozzle holes of the nozzle plate by the pressure of the bubbles.

In the case where the stimulus is "pressure," the piezoelectric element is bent by applying voltage to the piezoelectric element bonded to a position, so called, the pressure chamber in an ink flow path of the inkjet head. As a result, a volume of the pressure chamber is contracted to eject the ink, as droplets, from the nozzle holes of the inkjet head.

Among the above-described examples, a piezo system where an ink is discharged by applying voltage to a piezoelectric element is preferable.

Figure 2:
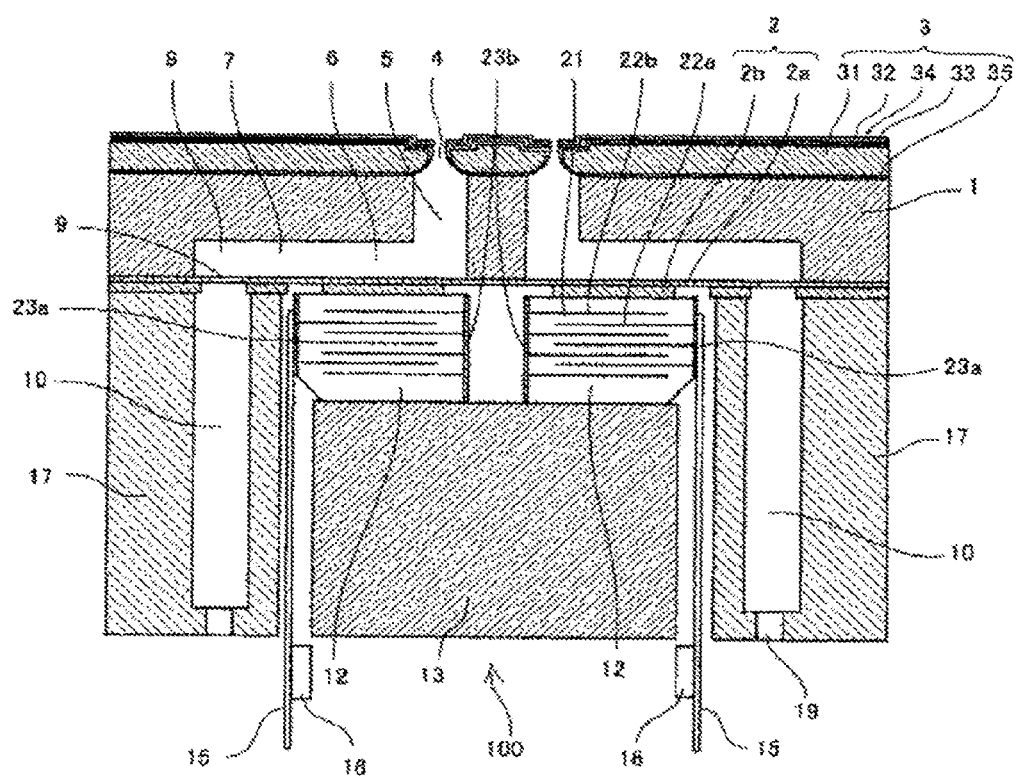
FIG. 2 is an explanatory cross-sectional view of a liquid chamber of the inkjet head along a longitudinal direction.
Figure 3:
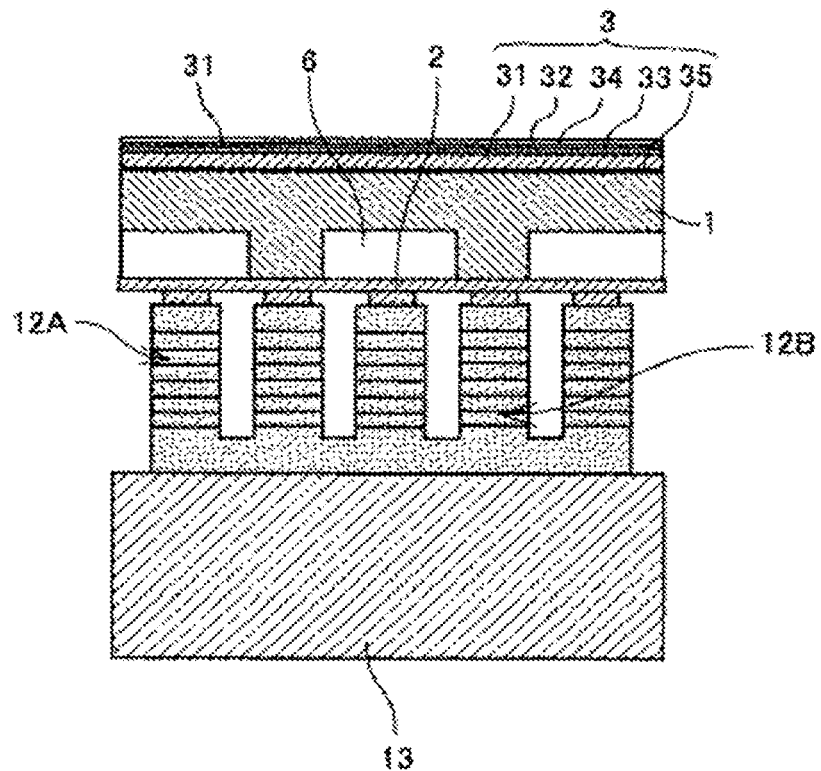
FIG. 3 is an explanatory cross-sectional view of the liquid chamber of the inkjet head along a transverse direction.

One example of an inkjet head for use in the present disclosure is described with reference to FIGS. 1 to 3. Note that, FIG. 1 is a an exploded perspective view illustrating the inkjet head, FIG. 2 is an explanatory cross-sectional view of the inkjet head along a direction orthogonal to the nozzle arrangement direction of the head (liquid chamber longitudinal direction), and FIG. 3 is an explanatory cross-sectional view of the inkjet head along the nozzle arrangement direction of the head (liquid chamber transverse direction).

The inkjet head includes a flow-path board (liquid-chamber substrate or flow-path member) 1, a diaphragm member 2 joined to a bottom surface of the flow-path board 1, and a nozzle plate 3 that is a nozzle forming member joined to a top surface of the flow-path board 1. The above-mentioned members form a plurality of liquid chambers (also referred to as a press liquid chamber, pressure chamber, pressurizing chamber, or flow path) 6 that are flow paths respectively connected to nozzle holes 4 via nozzle communicating paths 5, a fluid resistance part 7 also serving as a supply path configured to supply an ink to the liquid chamber 6, and a communicating part 8 communicating with the liquid chamber 6 via the fluid resistance part 7. An ink is supplied to the communicating part 8 from a common liquid chamber 10 formed in the frame member 17 through a supply port 19 formed in the diaphragm member 2.

The flow-path board 1 has openings, such as the communicating path 5, the pressure liquid chamber 6, and the fluid resistance part 7 formed by etching a silicon substrate. Note that, the flow-path board 1 can be also formed, for example, by etching an SUS substrate using an acid etching liquid, or machining, such as punching (press), the SUS substrate.

The diaphragm member 2 has a vibration region (diaphragm) 2a forming a wall surface corresponding to each liquid chamber 6, an island-shape convex part 2b is disposed on an outer surface side of the vibration region 2a (a side of a surface opposite to the liquid chamber 6), a laminate piezoelectric element 12 is as a driving element (actuator unit or pressure generating unit) configured to deform the vibration region 2a to generate energy for ejecting droplets, and a top edge surface (joined surface) of each piezoelectric element column 12A of the piezoelectric element 12 is joined to the island-shape convex part 2b. Moreover, a bottom edge surface of the laminate piezoelectric element 12 is joined to a base member 13.

The piezoelectric element 12 is an element, in which a piezoelectric material layer 21, such as PZT, and internal electrodes 22a and 22b are alternately laminated. The internal electrodes 22a and 22b are respectively drawn to edge surfaces, i.e., side surfaces substantially vertical to the diaphragm 2 of the piezoelectric element 12, to connect to edge surface electrodes (external electrodes) 23a and 23b formed on the side surfaces, and voltage is applied to the edge surface electrodes (external electrodes) 23a and 23b to generate a displacement in the laminate direction. The piezoelectric element 12 is a piezoelectric element, in which the predetermined number of piezoelectric element columns 12A and 12B are formed in the piezoelectric element member by forming grooves through half-cut dicing.

Note that, the piezoelectric element columns 12A and 12B of the piezoelectric element 12 are identical, but the piezoelectric element columns driven by applying a drive wave form is distinguished as the piezoelectric element column 12A, and the piezoelectric element column used merely as a support without applying a drive waveform is distinguished as the piezoelectric element column 12B. The piezoelectric element can adapt either a bipitch structure where the piezoelectric element column 12A for driving and the piezoelectric element column 12B for supporting are alternately used, or a normal pitch structure where all the piezoelectric element columns are used as the piezoelectric element columns 12A for driving.

As described, used is a structure where two lines of a driving element array (array of piezoelectric element columns 12A for driving), in which a plurality of the piezoelectric element columns 12A for driving are aligned as driving elements, are arranged on the base member 13.

Moreover, used is a system where the ink inside the liquid chamber 6 is pressed by using the displacement along the d33 direction as the piezoelectric direction of the laminate piezoelectric element 12. However, a system where the ink inside the pressure liquid chamber 6 is pressed by using the displacement along the d31 direction as the piezoelectric direction of the laminate piezoelectric element 12 may be used.

Moreover, a material of the piezoelectric element is not particularly limited. An electro-mechanical conversion element, such as ferroelectrics (e.g., $BaTiO_3$, $PbTiO_3$, and $(NaK)NbO_3$) typically used as piezoelectric materials may be used. Moreover, the laminate piezoelectric element is used above, but a single-plate piezoelectric element may be used. The single-plate piezoelectric element may be a cut piezoelectric material, a thick film of a piezoelectric material formed by screen printing and sintering, or a thin film of a piezoelectric material formed by sputtering, vapor deposition, or a sol-gel method. Moreover, one line or several lines of the laminate piezoelectric elements 12 may be disposed on one base member 13.

FPC 15, which serves as a wiring member for applying a driving signal, is directly connected with a solder member to the external electrode 23a of each piezoelectric element column 12A for driving of the piezoelectric element 12, and a driving circuit (driver IC) 16, which is configured to selectively apply a driving waveform to each piezoelectric element column 12A for driving of the piezoelectric element 12, is mounted on the FPC 15. Note that, all of the external electrodes 23b of the piezoelectric element columns 12A are electrically jointly connected with a solider member, similar to the common wiring of the FPC 15. In the present embodiment, moreover, solder plating is performed onto an output terminal of FPC 15 connected to the piezoelectric element 12 to realize a solder joint, but solder plating may be performed at a side of the piezoelectric element 12 not FPC 15. Other than the solder joint, moreover, joining using an anisotropic conductive film, or wire bonding may be used as the joining method.

The nozzle plate 3 includes an ink-repellent film 32 formed on a droplet ejection side of a surface of the nozzle base 31 (a surface of the ejection direction: an ejecting surface, or a surface opposite to the side of the liquid chamber 6, a nozzle-formed surface) into which pores constituting nozzle holes 4 having diameters of 10 μm or greater but 35 μm or smaller corresponding to respective liquid chambers 6 are formed.

Moreover, a frame member 17 formed by inject molding an epoxy-based resin or polyphenylene sulfite is joined with the outer peripheral side of a piezoelectric actuator unit 100 formed of, for example, the piezoelectric element 12 into which FPC 15 is mounted (connected) and the base member 13. The above-described common liquid chamber 10 is formed in the frame member 17, and a supply port 10 for supplying the ink externally to the common liquid chamber 10. The supply port 19 is communicated with an ink supply source, such as a subtank, and an ink-stored container, which is not illustrated.

In the inkjet having the above-described structure, the piezoelectric element column 12A is contracted, for example, by reducing the voltage applying to the piezoelectric element column 12A for driving from the standard potential to lower the vibration region 2a of the diaphragm member 2 to thereby expand a volume of the liquid chamber 6. As a result, the ink is flown into the liquid chamber 6. Then, the voltage applying to the piezoelectric element column 12A is increased to expand the piezoelectric element column 12A in the laminate direction to deform the diaphragm member 2 in the nozzle hole 4 direction to thereby contract the capacity or volume of the liquid chamber 6. As a result, the ink inside the liquid chamber 6 is pressed to eject droplets of the ink from the nozzle holes 4.

Then, the diaphragm member 2 is returned to the initial position by returning the voltage applied to the piezoelectric element column 12A to the standard potential to expand the liquid chamber 6 to thereby generate negative pressure. Therefore, the ink is introduced into the liquid chamber 6 from the common liquid chamber 10. After damping vibration of meniscus surfaces of the nozzle hole 4 and stabilizing the meniscus surfaces, an operation for ejecting next droplets is started.

Note that, the driving method of the inkjet head is not limited to the above-described example (pulling-pushing ejection), pulling ejection or pushing ejection can be performed depending on a way for applying a driving waveform.

<Ink>

The ink includes a colorant, at least one organic solvent, and water, preferably further includes a surfactant, and may further include other ingredients according to the necessity.

A dynamic surface tension A of the ink at 25° C. with a surface lifetime of 15 msec as measured by the maximum bubble pressure method is 34.0 mN/m or less, and the dynamic surface tension A and a static surface tension B of the ink at 25° C. satisfy a formula below, $10.0\% \leq [(A-B)/(A+B)] \times 100 \leq 19.0\%$. Since the ink has such a dynamic surface tension A, sufficient wettability of the ink to a printing medium can be ensured, and moreover the ink can promptly penetrates into coated paper, which includes a coated layer, and has poor absorption of the ink, such as general-purpose printing sheets. Therefore, aggregation of the pigment in the ink is significantly caused during drying after depositing the ink on a surface of the paper to thicken the ink, to thereby prevent beading.

The dynamic surface tension A of the ink at 25° C. with a surface lifetime of 15 msec as measured by the maximum bubble pressure method is 34.0 mN/m or less, preferably 30.0 mN/m or less, and more preferably 25.0 mN/m or greater but 30.0 mN/m or less.

Since the dynamic surface tension A is 34.0 mN/m or less, excellent wettability to general-purpose printing sheets and excellent permeability are obtained, and an effect of preventing beading and color bleeding is enhanced. Moreover, coloring is improved on plain paper and occurrences of white missing spots are prevented on plain paper.

The dynamic surface tension of the ink with a surface lifetime of 15 msec as measured by the maximum bubble pressure method can be measured at 25° C., for example, by means of SITA DynoTester (available from SITA Messtechnik GmbH).

The dynamic surface tension A and a static surface tension B of the ink at 25° C. satisfy a formula below, $$10.0\% \leq [(A-B)/(A+B)] \times 100 \leq 19.0\%,$$

and preferably a formula below, $$12.0\% \leq [(A-B)/(A+B)] \times 100 \leq 17.0\%.$$

Since the dynamic surface tension A and the static surface tension B of the ink at 25° C. satisfy the formula below, $10.0\% \leq [(A-B)/(A+B)] \times 100 \leq 19.0\%$, a balance between the dynamic surface tension A and the static surface tension B of the ink is optimized. Since the receding contact angle of the ink relative to the nozzle plate is 35° or greater, it is difficult to wet the ink-repellent film of the nozzle plate of the inkjet head with the ink. As a result, ejection stability can be assured, and an extremely stable and ideal printing device, which does not cause nozzle missing failures during continuous ejection is obtained.

A receding contact angle of the ink relative to the nozzle plate is 35° or greater, preferably 35° or greater but 80° or less, and more preferably 40° or greater but 70° or less.

When the receding contact angle is 35° or greater, it is easily repel the ink again even of the ink is deposited on an inner wall surface of the ink chamber of the inkjet head. Note that, the upper limit of the receding contact angle is not particularly limited in terms of wettability because it is more difficult as the receding contact angle increases. In view of permeability of the ink into a printing medium, however, the upper limit preferably does not exceed 80° (80° or less).

For example, the receding contact angle can be measured by an expansion and contraction method using an automatic contact angle measuring device. Examples of the automatic contact angle measuring device include DSA25 (available from KRUSS GmbH).

For example, the receding contact angle can be measured using the nozzle plate for use in the present disclosure by pushing 3 μL of the ink out from a syringe onto an outer surface of the nozzle plate, and measuring the receding contact angle of the ink by a contraction method using the device mentioned above. In the present disclosure, the receding contact angle is a value measured at a temperature of 25° C.

A static surface tension B of the ink at 25° C. is preferably 20.0 mN/m or greater but 30.0 mN/m or less.

When the static surface tension is 20.0 mN/m or greater but 30.0 mN/m or less, permeability of the ink can be enhanced, an effect of preventing cockling and curling is enhanced, and permeation drying properties for printing on plain paper are excellent.

The static surface tension of the ink can be measured at 25° C., for example, by means of an automatic surface tensiometer (CBVP-Z, Kyowa Interface Science Co., Ltd.).

—Organic Solvent—

At least one organic solvent having a solubility parameter of 9 or greater but less than 11.8 is preferably included as the organic solvent. Since the organic solvent having a solubility parameter of 9 or greater but less than 11.8 is included, occurrences of beading can be prevented even when printing is performed on general-purpose printing sheets.

The solubility parameter (SP value) is a numeric value quantifying and indicating how easily a solute is soluble to a solvent. The SP value represents an attraction force between a molecule of the solute and a molecule of the solvent, specifically, the square root of cohesive energy density (CED). Note that, CED is a quantity of energy required for evaporating a quantity of 1 mL.

The solubility parameter (SP value) is defined by the regular solution theory introduced by Hildebrand, and is an index for a solubility of a two-component solution.

There are various methods for calculating the SP value. In the present disclosure, however, the method of Fedors, which is typically used, is used.

The SP value can be measured using Formula (B) below according to the Fedors method.

SP value (solubility parameter)=(CED value)$^{1/2}$=(E/V)$^{1/2}$  Formula (B)

In Formula (B) E is molecular cohesive energy (cal/mol), and V is a molecular volume (cm$^3$/mol). E and V are respectively represented by Formula (C) and Formula (D) below, when Δei is evaporation energy of an atomic group, and Δvi is a mole volume.

E=ΣΔei  Formula (C)

V=ΣΔvi  Formula (D)

The data disclosed in Inoue, Minoru, *Basic Theory of Adhesion*, The Society of Polymer Science, Japan, Chapter 5 can be used for various data for the calculation method, evaporation energy Δei and mole volume Δvi of each atomic group.

As for the data not disclosed in the literature above, such as —CF$_3$ group, moreover, R. F. Fedors, Polym. Eng. Sci. 14, 147 (1974) can be referred to.

The organic solvent having a solubility parameter (SP value) of 9 or greater but less than 11.8 is preferably at least one selected from the group consisting of amine compounds represented by General Formula (I) below and oxetane compounds represented by General Formula (II).

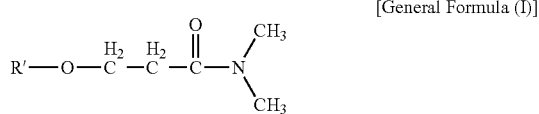

[General Formula (I)]

In General Formula (I), R' is an alkyl group containing from 4 through 6 carbon atoms.

[General Formula (II)]

In General Formula (II), R" is an alkyl group containing from 1 through 2 carbon atoms.

Examples of specific exemplary compounds of the amide compound represented by General Formula (I) and the oxetane compound represented by General Formula (II) include the following compounds.

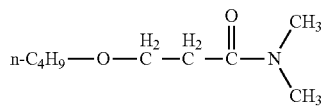

[Structural Formula (1), SP value: 9.03]

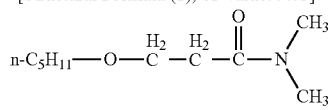

[Structural Formula (2), SP value: 9.00]

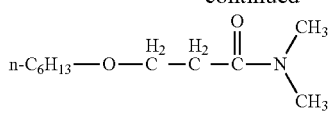

[Structural Formula (3), SP value: 8.96]

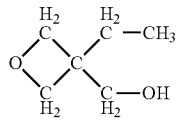

[Structural Formula (4), SP value: 11.3]

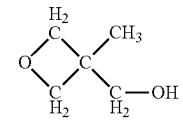

[Structural Formula (5), SP value: 11.79]

Other than the amide compounds represented by General Formula (I) and the oxetane compounds represented by General Formula (II), a multivalent alcohol having a solubility parameter (SP value) of 11.8 or greater but 14.0 or less, and a penetrating agent are preferably used as the organic solvent.

Examples of the multivalent alcohol having the solubility parameter (SP value) of 11.8 or greater but 14.0 or less include 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), 1,3-propanediol (SP value: 13.72), 1,2-hexanediol (SP value: 11.8), 1,6-hexanediol (SP value: 11.95), 3-methyl-1,5-pentanediol (SP value: 11.8), triethylene glycol (SP value: 12.12), and diethylene glycol (SP value: 13.02). The above-listed examples may be used alone or in combination.

Among the above-listed examples, 3-methyl-1,3-butanediol (SP value: 12.05), 1,2-butanediol (SP value: 12.8), 1,3-butanediol (SP value: 12.75), 1,4-butanediol (SP value: 12.95), 2,3-butanediol (SP value: 12.55), 1,2-propanediol (SP value: 13.5), and 1,3-propanediol (SP value: 13.72) are preferable, and 1,2-butanediol (SP value: 12.8) and 1,2-propanediol (SP value: 13.5) are more preferable.

A combined amount of the multivalent alcohol having a solubility parameter (SP value) of 11.8 or greater but 14.0 or less, the amide compound represented by General Formula (I), and the oxetane compound represented by General Formula (II) relative to a total amount of the ink is preferably 30% by mass or greater but 60% by mass or less.

When the amount is 30% by mass or greater, beading or color breeding between different colors on a general-purpose printing sheet may be prevented. When the amount is 60% by mass or less, excellent image quality is obtained, and an appropriate viscosity of a resultant ink can be obtained to realize excellent ejection stability.

The penetrating agent preferably has the solubility parameter of 9 or greater but less than 11.8. Examples of the penetrating agent include polyol compounds each containing from 8 through 11 carbon atoms, and glycol ether compounds.

Among the above-listed examples, 1,3-diol compounds represented by General Formula (VII) below are preferable, and 2-ethyl-1,3-hexanediol [SP value: 10.6] and 2,2,4-trimethyl-1,3-pentanediol [SP value: 10.8] are particularly preferable.

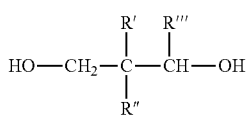

[General Formula (VII)]

In General Formula (VII), R' is a methyl group or an ethyl group, R" is a hydrogen atom or a methyl group, and R''' is an ethyl group or a propyl group.

Examples of other polyol compounds include
2-ethyl-2-methyl-1,3-propanediol, 3,3-dimethyl-1,2-butanediol,
2,2-diethyl-1,3-propanediol, 2-methyl-2-propyl-1,3-propanediol,
2,4-dimethyl-2,4-pentanediol, 2,5-dimethyl-2,5-hexanediol, and
5-hexene-1,2-diol.

An amount of the penetrating agent relative to a total amount of the ink is preferably 0.5% by mass or greater but 4% by mass or less, and more preferably 1% by mass or greater but 3% by mass or less. When the amount of the penetrating agent is 0.5% by mass or greater, a permeation effect of the ink can be obtained, contributing to a resulting image quality. When the amount is 4% by mass or less, an appropriate initial viscosity of the ink is obtained.

An amount of the organic solvent having the solubility parameter of 9 or greater but less than 11.8 is 20% by mass or greater, and preferably 20% by mass or greater but 60% by mass or less, relative to a total amount of the ink.

When the amount is 20% by mass or greater, occurrences of beading on a general-purpose printing sheet can be inhibited, and an effect of inhibiting color breading between different colors is improved. When the amount is 60% by mass or less, image quality is improved, and an appropriate viscosity of an ink is obtained to improve ejection stability.

The organic solvent does not include "multivalent alcohol having an equilibrium moisture content of 30% or greater at a temperature of 23° C. and relative humidity of 80%."

The equilibrium moisture content is determined by storing a dish, in which 1 g of each of the organic solvents has been weighed, in a desiccator, internal temperature and humidity of which have been maintained at a temperature of 23° C.±1° C., and a relative humidity of 80%±3% using a saturated aqueous solution of potassium chloride sodium chloride, and determining an equilibrium moisture content based on the following formula.

Equilibrium moisture content (%)=(an amount of moisture absorbed by the organic solvent/the organic solvent+the amount of moisture absorbed by the organic solvent)×100

Since the "multivalent alcohol having an equilibrium moisture content of 30% or greater at a temperature of 23° C. and relative humidity of 80%" is included as the organic solvent, permeation of the ink into coated paper, which includes a coated layer and has poor ink absorption, such as general-purpose printing sheets, slows down, drying speed of the ink after deposited on a surface of the paper is slow, and therefore beading may occur.

The "multivalent alcohol having an equilibrium moisture content of 30% or greater at a temperature of 23° C. and relative humidity of 80%" is used in Japanese Unexamined Patent Application Publication Nos. 2012-207202, 2014-94998, etc.

Examples of the "multivalent alcohol an equilibrium moisture content of which is 30% or greater at a temperature of 23° C. and relative humidity of 80%" include 1,2,3-butanetriol (equilibrium moisture content: 38%), 1,2,4-butanetriol (equilibrium moisture content: 41%), glycerin (equilibrium moisture content: 49%, SP value: 16.38), diglycerin (equilibrium moisture content: 38%), triethylene glycol (equilibrium moisture content: 39%, SP value: 15.4), tetraethylene glycol (equilibrium moisture content: 37%), diethylene glycol (equilibrium moisture content: 43%), and 1,3-butanediol (equilibrium moisture content: 35%).

—Surfactant—

The ink preferably includes a polyether-modified siloxane compound as the surfactant.

Since the polyether-modified siloxane compound is used as a surfactant, a resultant ink is hardly wet the ink-repellent film of the nozzle plate of the inkjet head. Therefore, ejection failures due to deposition of the ink on the nozzle are prevented to thereby improve ejection stability.

The polyether-modified siloxane compound is preferably at least one selected from compounds represented by General Formulae (III) to (VI) below, because dispersion stability is not impaired by a colorant for use or a combination of the organic solvents, a dynamic surface tension of a resultant ink is low, and desirable permeation and leveling are obtained.

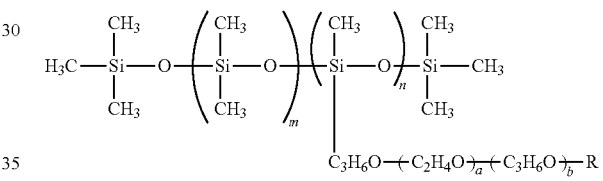

[General Formula (III)]

In General Formula (III), m is an integer of from 0 through 23; n is an integer of from 1 through 10; a is an integer of from 1 through 23; b is an integer of from 0 through 23; and R is a hydrogen atom or an alkyl group containing from 1 through 4 carbon atoms.

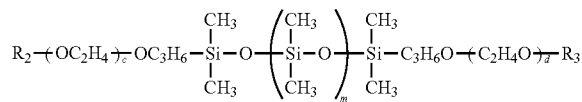

[General Formula (IV)]

In General Formula (IV), m is an integer of from 1 through 8; each of c and d is an integer of from 1 through 10; and each of $R_2$ and $R_3$ is a hydrogen atom or an alkyl group containing from 1 through 4 carbon atoms.

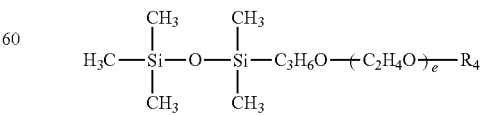

[General Formula (V)]

In General Formula (V), e is an integer of from 1 through 8, and $R_4$ is a hydrogen atom or an alkyl group containing from 1 through 4 carbon atoms.

[General Formula (VI)]

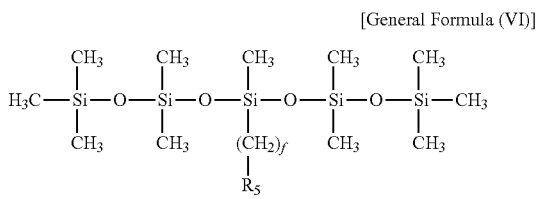

In General Formula (VI), f is an integer of from 1 through 8, and $R_5$ is a polyether group represented by General Formula (A) below.

[General Formula (A)]

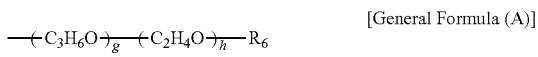

In General Formula (A), g is an integer of from 0 through 23 and h is an integer of from 0 through 23, but g and h are not 0 at the same time; and $R_6$ is a hydrogen atom or an alkyl group containing from 1 through 4 carbon atoms.

Examples of the polyether-modified siloxane compound represented by General Formula (III) include compounds represented by structural formulae below, but the polyether-modified siloxane compound is not limited to the compounds represented by the structural formulae below.

[Structural Formula (VI)]

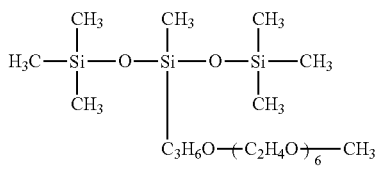

[Structural Formula (VII)]

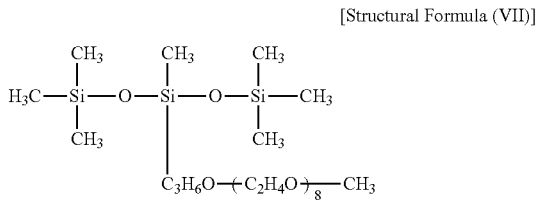

[Structural Formula (VIII)]

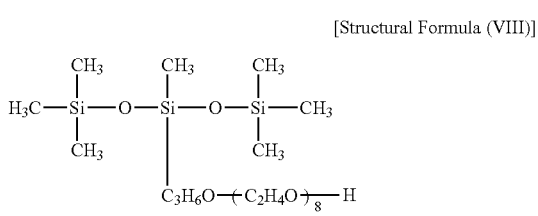

[Structural Formula (IX)]

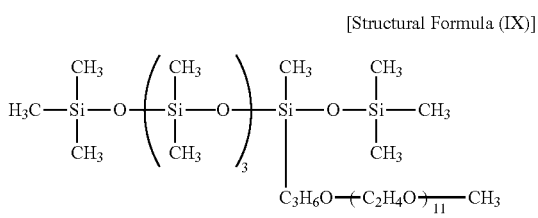

[Structural Formula (X)]

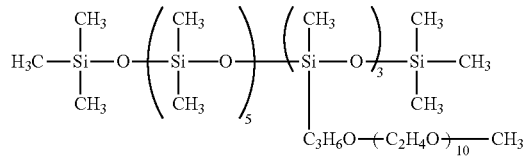

[Structural Formula (XI)]

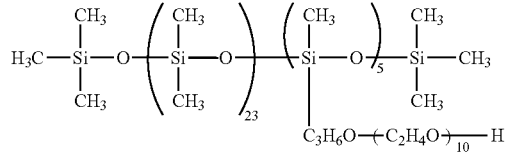

[Structural Formula (XII)]

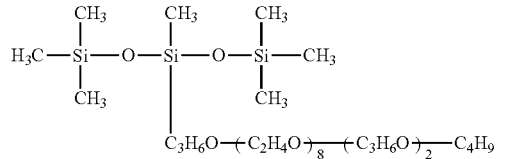

[Structural Formula (XIII)]

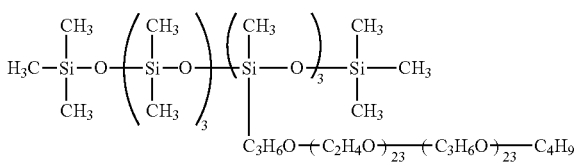

Examples of the polyether-modified siloxane compound represented by General Formula (IV) include compounds represented by structural formula below, but the polyether-modified siloxane compound is not limited to the compounds represented by the structural formula below.

[Structural Formula (XIV)]

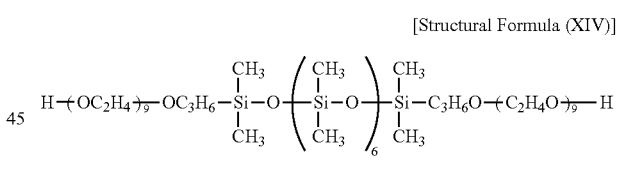

Examples of the polyether-modified siloxane compound represented by General Formula (V) include compounds represented by structural formula below, but the polyether-modified siloxane compound is not limited to the compounds represented by the structural formula below.

[Strucctural Formula (XV)]

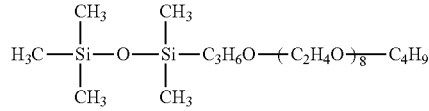

Examples of the polyether-modified siloxane compound represented by General Formula (VI) include compounds represented by structural formulae below, but the polyether-modified siloxane compound is not limited to the compounds represented by the structural formulae below.

[Structural Formula (XVI)]

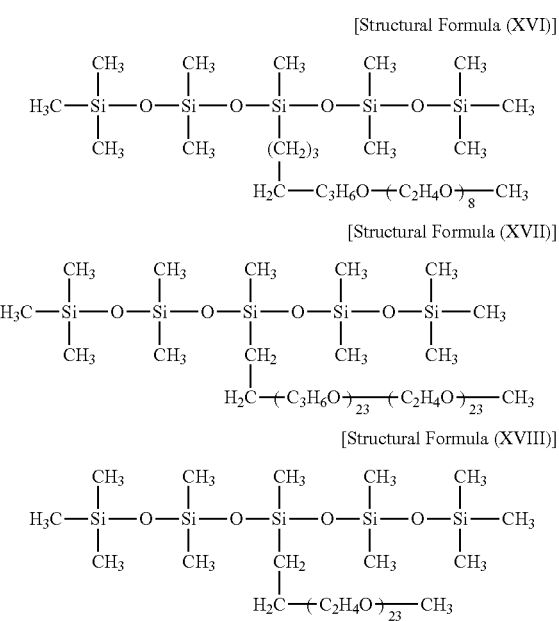

[Structural Formula (XVII)]

[Structural Formula (XVIII)]

The polyether-modified siloxane compound may be appropriately synthesized for use or selected from commercial products.

A synthesis method of the polyether-modified siloxane compound is not particularly limited and may be appropriately selected depending on the intended purpose. For examples, methods disclosed in Japanese Patent Nos. 5101598, 5032325, and 5661229 can be referred.

Specifically, the polyether-modified siloxane compound can be synthesized by allowing (A) polyether and (B) organohydrogen siloxane to go through a hydrosilylation reaction.

The polyether of the (A) component is a polyoxyalkylene copolymer represented by —($C_nH_{2n}O$)— (in the formula, n is from 2 through 4).

The polyoxyalkylene copolymer unit preferably include an oxyethylene unit —($C_2H_4O$)—, an oxypropylene unit —($C_3H_6O$)—, an oxybutylene unit —($C_4H_8O$)—, or a mixture of the foregoing units. The oxyalkylene unit may be arranged in any manner, and can form a block or random copolymer structure. The oxyalkylene unit preferably forms a random copolymer group. More preferably, the polyoxyalkylene includes both an oxyethylene unit ($C_2H_4O$) and an oxypropylene unit ($C_3H_6O$) in a random copolymer.

The organohydrogen siloxane of the (B) component is organopolysiloxane including at least one hydrogen bonded to silicon (SiH) per molecule. Examples of the organopolysiloxane include the arbitrary number or a mixture of siloxane units, such as ($R_3SiO_{0.5}$), ($R_2SiO$), ($RSiO_{1.5}$), and ($SiO_2$) (in the formulae, R is independently an organic group or a hydrocarbon group).

In the case where R of ($R_3SiO_{0.5}$), ($R_2SiO$), and ($RSiO_{1.5}$) of the organopolysiloxane is a methyl group, the siloxy units are respectively represented as M, D, and T units, and the siloxy unit ($SiO_2$) is represented as a Q unit.

The organohydrogen siloxanes have similar structures, but the organohydrogen siloxane has at least one SiH present on the siloxy unit.

A methyl-based siloxy unit in the organohydrogen siloxane can be represented as a unit including a "$M^H$" siloxy unit ($R_2HSiO_{0.5}$), a "$D^H$" siloxy unit (RHSiO), and a "$T^H$" siloxy unit ($HSiO_{1.5}$).

The organohydrogen siloxane can the arbitrary number of M, $M^H$, D, $D^H$, T, $T^H$, or Q siloxy units, with the proviso that at least one siloxy unit includes SiH.

The (A) component and the (B) component are reacted through a hydrosilylation reaction. The hydrosilylation is not particularly limited and may be appropriately selected depending on the intended purpose, but the hydrosilylation reaction is preferably performed by adding a hydrosilylation catalyst.

The hydrosilylation catalyst is not particularly limited and may be appropriately selected depending on the intended purpose. Examples of the hydrosilylation catalyst include: metals, such as platinum, rhodium, ruthenium, palladium, osmium, and iridium; organic metal compounds of the foregoing metals; and mixtures of the foregoing metals and compounds.

An amount of the hydrosilylation catalyst based on a weight of the (A) component and the (B) component as a standard is preferably 0.1 ppm or greater but 1,000 ppm or less, and more preferably 1 ppm or greater but 100 ppm or less.

The hydrosilylation reaction can be performed without diluting, or in the presence of a solvent. However, the hydrosilylation reaction is preferably performed in the presence of a solvent.

Examples of the solvent include alcohols (e.g., methanol, ethanol, isopropanol, butanol, and n-propanol), ketones (e.g., acetone, methyl ethyl ketone, and methyl isobutyl ketone); aromatic hydrocarbons (e.g., benzene, toluene, and xylene); aliphatic hydrocarbons (e.g., heptane, hexane, and octane); glycol ethers (e.g., propylene glycol methyl ether, dipropylene glycol methyl ether, propylene glycol n-butyl ether, propylene glycol n-propyl ether, and ethylene glycol n-butyl ether), halogenated hydrocarbons (e.g., dichloromethane, 1,1,1-trichloroethane, methylene chloride, and chloroform), dimethyl sulfoxide, dimethyl form amide, acetonitrile, tetrahydrofuran, volatile oils, mineral spirit, and naphtha. The above-listed examples may be used alone or in combination.

Amounts of the (A) component and the (B) component used for the hydrosilylation reaction are not particularly limited and can be appropriately adjusted depending on the intended purpose. The amounts can be represented by a molar ratio of a total of the unsaturated groups in the (A) component to an amount of SiH in the (B) component. The hydrosilylation reaction is preferably performed using 20 mol % or less of a polyether unsaturated group amount, more preferably 10 mol % or less of a polyether unsaturated group amount relative to a molar amount of SiH of the organohydrogen siloxane.

The hydrosilylation reaction is not particularly limited, and can be performed according to an appropriate batch method, semi-continuous method, or continuous method known in the art. For example, the hydrosilylation reaction can be performed according to a continuous method using a plug flow reactor.

Examples of the commercial products of the polyether-modified siloxane compound include: 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191 (all available from DOW CORNING TORAY CO., LTD.); TSF4440, TSF4441, TSF4445, TSF4446, TSF4450, TSF4452, and TSF4460 (all available from Momentive Performance Materials Inc.); SILFACE SAG002, SILFACE SAG003, SILFACE SAG005, SILFACE SAG503A, SILFACE SAG008, and SILFACE SJM003 (all available from Nissin Chemical Co., Ltd.); TEGO Wet KL245, TEGO Wet 250, TEGO Wet 260, TEGO Wet 265, TEGO Wet 270, and TEGO Wet 280 (all available from Evonik Industries AG); and BYK-345, BYK-347, BYK-348, BYK-375, and BYK-377 (all available from BYK Japan K.K.). The above-listed examples may be used alone or in combination.

Among the above-listed examples, TEGO Wet 270 (available from Evonik Industries AG) and SILFACE SAG503A (available from Nissin Chemical Co., Ltd.) are preferable.

Other than the polyether-modified siloxane compound, a fluorine-based surfactant, a silicone-based surfactant, or an acetylene glycol- or acetylene alcohol-based surfactant may be used in combination, as the surfactant.

An amount of the surfactant relative to a total amount of the ink is preferably 0.001% by mass or greater but 5% by mass or less, and more preferably 0.5% by mass or greater but 3% by mass or less. When the amount is 0.001% by mass or greater but 5% by mass or less, a resultant ink does not easily wet the ink-repellent film of the nozzle plate of the inkjet head, and therefore ejection failures of the ink due to deposition of the ink on the nozzle to thereby obtain an effect of improving ejection stability.

—Colorant—

A water-dispersible pigment is preferably used as the colorant. A dye may be used in combination for the purpose of adjusting a color tone, but the dye is preferably used at the level where weather resistance of a resultant ink is not adversely affected.

As a pigment in the water-dispersible pigment, there are an organic pigment and an inorganic pigment.

Examples of the inorganic pigment include titanium oxide, iron oxide, calcium carbonate, barium sulfate, aluminium hydroxide, barium yellow, cadmium red, chrome yellow, and carbon black. Among the above-listed examples, carbon black is preferable.

As the carbon black (Pigment Black 7), there are carbon blacks produced by methods known in the art, such as a contact method, a furnace method, and a thermal method. Examples of the carbon black include channel black, furnace black, gas black, and lamp black.

Examples of a commercial product of the carbon black include: carbon black available from Cabot Corporation under the names of Regal (registered trademark), Black Pearls (registered trademark), Elftex (registered trademark), Monarch (registered trademark), Regal (registered trademark), Mogul (registered trademark), and Vulcan (registered trademark) (e.g., Black Pearls 2000, Black Pearls 1400, Black Pearls 1300, Black Pearls 1100, Black Pearls 1000, Black Pearls 900, Black Pearls 880, Black Pearls 800, Black Pearls 700, Black Pearls 570, Black Pearls L, Elftex 8, Monarch 1400, Monarch 1300, Monarch 1100, Monarch 1000, Monarch 900, Monarch 880, Monarch 800, Monarch 700, Mogul L, Regal 330, Regal 400, Regal 660, and Vulcan P); and SENSIJET Black SDP100 (available from Sensient Technologies Corporation), SENSIJET Black SDP1000 (available from Sensient Technologies Corporation), and SENSIJET Black SDP2000 (available from Sensient Technologies Corporation). The above-listed examples may be used alone or in combination.

Examples of the organic pigment include an azo pigment, a polycyclic pigment, a dye chelate, a nitro pigment, a nitroso pigment, and aniline black. Among the above-listed examples, an azo pigment and a polycyclic pigment are preferable.

Examples of the azo pigment include azo lakes, insoluble azo pigments, condensed azo pigments, and chelate azo pigments. Examples of the polycyclic pigments include phthalocyanine pigments, perylene pigments, perynone pigments, anthraquinone pigments, quinacridone pigments, dioxazine pigments, indigo pigments, thioindigo pigments, isoindolinone pigments, and quinophthalone pigments. Examples of the dye chelate include basic dye chelates, and acid dye chelates.

Specific examples of the organic pigment include: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 139, 150, 151, 155, 153, 180, 183, 185, 213; C.I. Pigment Orange 5, 13, 16, 17, 36, 43, 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (cadmium red), 112, 114, 122 (quinacridone magenta), 123, 146, 149, 166, 168, 170, 172, 177, 178, 179, 185, 190, 193, 209, 219; C.I. Pigment Violet 1 (rhodamine lake), 3, 5:1, 16, 19, 23, 38; C.I. Pigment Blue 1, 2, 15 (phthalocyanine blue), 15:1, 15:2, 15:3 (phthalocyanine blue), 16, 17:1, 56, 60, 63; and C.I. Pigment Green 1, 4, 7, 8, 10, 17, 18, 36. The above-listed examples may be used alone or in combination.

A specific surface area of the pigment is not particularly limited and may be appropriately selected depending on the intended purpose. The specific surface area of the pigment is preferably 10 $m^2/g$ or greater but 1,500 $m^2/g$ or less, more preferably 20 $m^2/g$ or greater but 600 $m^2/g$ or less, and even more preferably 50 $m^2/g$ or greater but 300 $m^2/g$ or less.

In the case where a specific surface area of the pigment does not match to a desired surface area, a size-reduction treatment or pulverizing treatment (e.g., ball mill pulverization, jet mill pulverization, and an ultrasonic wave treatment) may be performed to adjust the surface area to obtain the pigment having relatively small particle diameters.

A volume average particle diameter ($D_{50}$) of the pigment in the ink is preferably 10 nm or greater but 200 nm or less.

Examples of the water-dispersible pigment include: (1) a surfactant-dispersed pigment where a pigment is dispersed by a surfactant; (2) a resin-dispersed pigment where a pigment is dispersed by a resin; (3) a resin-coated dispersible pigment where a surface of a pigment is coated with a resin; and (4) a self-dispersible pigment where hydrophilic groups are provided on a surface of the pigment.

Among the above-listed examples, (3) the resin-coated pigment where a surface of the pigment is coated with a resin, and (4) the self-dispersible pigment where hydrophilic groups are provided on a surface of the pigment are preferable because storage stability is higher over time, and an increase in viscosity of a resultant ink can be prevented when a moisture is evaporated from the ink.

The (4) self-dispersible pigment including a hydrophilic functional group is preferably a self-dispersible pigment that is anionically charged. Examples of the anionic functional group include —COOM, —$SO_3$M, —$PO_3$HM, —$PO_3M_2$, —$CONM_2$, —$SO_3NM_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$. Examples of the counter ion M include an alkali metal ion and a quaternary ammonium ion. Among the above-listed examples, a quaternary ammonium ion is preferable.

Examples of the quaternary ammonium ion include tetramethyl ammonium ion, tetraethyl ammonium ion, tetrapropyl ammonium ion, tetrabutyl ammonium ion, tetrapentyl ammonium ion, benzyltrimethyl ammonium ion, benzyltriethyl ammonium ion, tetrahexyl ammonium ion, tetraethyl ammonium ion, tetrabutyl ammonium ion, and benzyl trimethyl ammonium ion. Among the above-listed examples, tetrabutyl ammonium ion is preferable.

It is assumed that the pigment exhibits compatibility even in a water-rich ink or an organic-solvent-rich ink from which a moisture has been evaporated, and a dispersed state of the pigment can be stably maintained when the self-dispersible pigment including the hydrophilic functional group and the quaternary ammonium ion is used.

An ink using, among the above-listed self-dispersible pigment, a pigment modified with at least one of a geminal bisphosphonic acid group and a geminal bisphosphonic acid salt group has excellent re-dispersibility after drying. Accordingly, such an ink does not cause clogging even when printing is stopped for a long period, and a moisture of the ink adjacent to a nozzle of an inkjet head is evaporated, and excellent printing can be easily performed after a simple cleaning operation. Moreover, the ink has high storage stability over time, and an increase in the viscosity of the ink can be prevented when the moisture is evaporated. Therefore, excellent properties of inhibiting deposition of the ink by a head maintaining device, and excellent ejection reliability can be achieved.

Specific examples of the phosphonic acid group or phosphonic acid salt group include groups represented by Structural Formulae (i) to (iv) below.

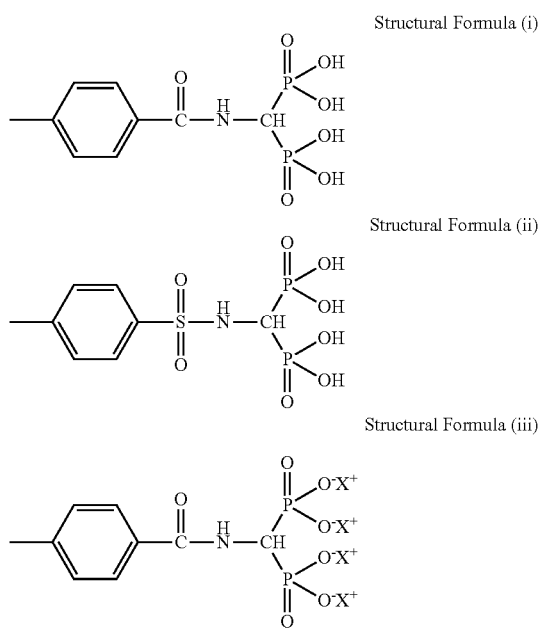

In Structural Formula (iii), $X^+$ is $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

In Structural Formula (iv), $X^+$ is $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

—Surface Modification Treatment of Pigment—

A surface modification treatment of the pigment is described taking a case of a geminal bisphosphonic acid group as an example. As the modification method, for example, there are Method A and Method B below.

[Method A]

In the environment at room temperature, 20 g of carbon black, 20 mmol of a compound represented by Structural Formula (v) or Structural Formula (vi) below, and 200 mL of ion-exchanged ultrapure water were mixed by means of Silverson Mixer (6,000 rpm). In the case where the pH of the obtained slurry is higher than 4, 20 mmol of nitric acid is added. Thirty minutes later, sodium nitrite (20 mmol) dissolved in a small amount of ion-exchanged ultrapure water is gradually added to the mixture above. The resultant was heated to 60° C. with stirring and was allowed to react for 1 hour to thereby generate a modified pigment, in which a compound represented by Structural Formula (v) or Structural Formula (vi) below has been added to the carbon black. Subsequently, the pH of the resultant is adjusted to 10 with a NaOH aqueous solution. Thirty minutes later, a modified pigment dispersion liquid is obtained. Subsequently, ultrafiltration is performed with a dialysis membrane using the dispersion liquid and ion-exchanged ultrapure water. Ultrasonic dispersion is further performed on the resultant to thereby obtain modified pigment dispersion, which is obtained by concentrating the solid content of the dispersion liquid.

[Method B]

ProcessAll 4HV Mixer (4 L) is charged with 500 g of dry carbon black, 1 L of ion-exchanged ultrapure water, and 1 mol of a compound represented by Structural Formula (v) or Structural Formula (vi) below. Subsequently, the mixture is strongly mixed at 300 rpm for 10 minutes with heating at 60° C. To the resultant, a 20% sodium nitrite aqueous solution [1 molar equivalent based on a compound represented by Structural Formula (v) or a compound represented by Structural Formula (vi)] was added over 15 minutes, and the resultant mixture was mixed and stirred for 3 hours with heating at 60° C.

The reaction product is collected by diluting with 750 mL of ion-exchanged ultrapure water, and ultrafiltration is performed with a dialysis membrane using the obtained modified pigment dispersed element and ion-exchanged ultrapure water. Moreover, ultrasonic dispersion is performed to obtain modified pigment dispersion, which are obtained by concentrating a solid content. In the case where there are many coarse particles, the coarse particles are preferably removed by means of a centrifuge.

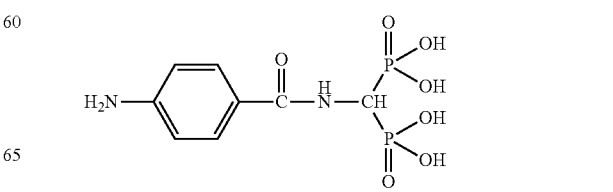

[Structural Formula (v)]

[Structural Formula (vi)]

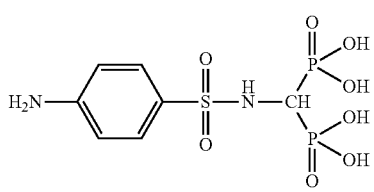

A pH regulator may be optionally added to the obtained modified pigment dispersion. Any of pH regulators identical to the ones usable in the ink described later may be used as the pH regulator. Among the examples listed later, $Na^+$, $N(CH_3)_4^+$, $N(C_2H_5)_4^+$, $N(C_3H_7)_4^+$, and $N(C_4H_9)_4^+$ are preferable.

When a treatment with the pH regulator is performed, at least part of a compound represented by Structural Formula (v) or Structural Formula (vi) is turned into a salt of the compound represented by structural Formula (v) or Structural Formula (vi) (equivalent to a compound represented by Structural Formula (iii) or Structural Formula (iv)).

The (3) resin-coated pigment where a surface of the pigment is covered with a resin is preferably a polymer emulsion, in which a pigment is included in polymer particles.

The polymer emulsion, in which the pigment is included in the polymer particles, is an emulsion where a pigment is encapsulated in polymer particles, or an emulsion where a pigment is adsorbed on surfaces of polymer particles. In the case as mentioned, it is not necessary that all of the pigment is encapsulated in or adsorbed on the polymer particles, and part of the pigment may be dispersed in the emulsion as long as the dispersed pigment do not adversely affect an obtainable effect of the present disclosure.

Examples of the polymer forming the polymer emulsion (the polymer of the polymer particles) include vinyl-based polymers, polyester-based polymers, and polyurethane-based polymers. Polymers particularly preferably used are vinyl-based polymers and polyester-based polymers, and polymers disclosed in Japanese Unexamined Patent Application Publication Nos. 2000-53897 and 2001-139849 are incorporated by reference.

In case of the polymer emulsion, a typical organic pigment, or a composite pigment where inorganic pigment particles are coated with an organic pigment or carbon black is preferably used. The composite pigment can be produced by a method where an organic pigment is precipitated in the presence of inorganic pigment particles, or a mechano-chemical method where an inorganic pigment and an organic pigment are mechanically mixed and ground.

Optionally, a layer of an organosilane compound generated from polysiloxane or alkylsilane may be disposed between an inorganic pigment and an organic pigment to improve adhesion between the inorganic pigment and the organic pigment.

The organic pigment and the inorganic pigment are not particularly limited, and are appropriately selected from the examples listed above.

A mass ratio of the inorganic pigment particles to the colorant that is an organic pigment or carbon black is preferably from 3:1 through 1:3, and more preferably from 3:2 through 1:2.

When an amount of the colorant is small, coloring or tinting ability may be low. When the amount of the colorant is large, transparency or a color tone may be impaired.

As such color material particles, in which the inorganic pigment particles are coated with the organic pigment or carbon black, a silica/carbon black composite material, silica/phthalocyanine PB15:3 composite material, silica/disazo yellow composite material, and silica/quinacridone PR122 composite material, all available from TODA KOGYO CORP. are preferably used because each of the foregoing composite materials have a small average primary particle diameter.

In the case where inorganic pigment particles having a primary particle size of 20 nm are coated with an equivalent amount of an organic pigment, a primary particle size of the resultant pigment is about 25 nm. If the pigment can be dispersed into a size of primary particles using an appropriate dispersant, an extremely fine pigment-dispersed ink having a dispersed particle size of 25 nm can be produced.

When the composite pigment is used, it is important to select a pigment dispersant that can stabilize dispersion of both the organic pigment and the inorganic pigment, because not only the organic pigment present on the surface contributes the dispersion, characteristics of the inorganic pigment present at a center of each particle appear through a thin organic pigment layer having a thickness of 2.5 nm.

An amount of the colorant relative to a total amount of the ink is preferably 1% by mass or greater but 15% by mass or less, and more preferably 2% by mass or greater but 10% by mass or less. When the amount is 1% by mass or greater, sufficient coloring and image density of the ink can be obtained. When the amount is 15% by mass or less, thickening of the ink and deterioration of ejectability of the ink can be prevented, and it is economically preferable.

—Water—

For example, pure water or ultrapure water, such as ion-exchanged water, ultrafiltration water, Milli-Q water, distilled water, can be used as the water.

An amount of the water in the ink is not particularly limited and may be appropriately selected depending on the intended purpose.

—Other Ingredients—

The above-mentioned other ingredients are not particularly limited and can be appropriately selected according to the necessity. Examples of other ingredients include a foam inhibitor (defoaming agent), a water-dispersible resin, a pH regulator, a preservative and fungicide, a chelate reagent, a corrosion inhibitor, antioxidant, an ultraviolet absorber, an oxygen absorber, and a photostabilizer.

—Foam Inhibitor (Defoaming Agent)—

The foam inhibitor (defoaming agent) is used by adding a small amount of the foam inhibitor to the ink to inhibit foaming. In the present specification, the foaming means that the ink is turned into a thin film to encapsulate air. The generation of foam is related to properties of the ink, such as a surface tension, and viscosity. Specifically, an ink having a high surface tension, such as water, is hard to foam because a force for minimizing a surface area of the ink acts. On the other hand, an ink having a high viscosity and high permeability is easily formed because the ink has a low surface tension, and the generated foam tends to be remained and is difficult to defoam because of the viscosity of the solution.

Typically, the foam inhibitor locally decreases a surface tension of a foam film to break the foam, or the foam inhibitor insoluble to the foamed liquid is dotted on a surface of the foamed liquid to break the foam. In the case where a polyether-modified siloxane compound, which has a strong effect of decreasing a surface tension, is used as a surfactant in the ink, the surface tension of the foam film cannot be locally decreased even by using the foam inhibitor of the former system. Therefore, such a foam inhibitor is not typically used. Accordingly, the latter foam inhibitor insoluble to the foamed liquid is used. In this case, however, stability of a resultant ink is low because of the foam inhibitor insoluble to the solution.

On the other hand, a foam inhibitor represented by General Formula (VIII) has an effect of reducing a surface tension, where the effect is not as strong as the effect of the polyether-modified siloxane compound, and has high compatibility to the polyether-modified siloxane compound. Therefore, the foam inhibitor is effectively incorporated into the foam film to create a locally imbalanced state of a surface of the foam film due to a difference in the surface tension between the polyether-modified siloxane compound and the foam inhibitor, to thereby break foam.

As the foam inhibitor, a compound represented by General Formula (A) below is used.

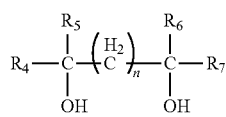

<General Formula (A)>

In General Formula (A), $R_4$ and $R_5$ are each independently an alkyl group containing from 3 through 6 carbon atoms; $R_6$ and $R_7$ are each independently an alkyl group containing from 1 through 2 carbon atoms; and n is an integer of from 1 through 6.

Examples of the compound represented by General Formula (A) include 2,4,7,9-tetramethyldecane-4,7-diol, and 2,5,8,11-tetramethyldodecane-5,8-diol. Among the above-listed examples, 2,5,8,11-tetramethyldodecane-5,8-diol is preferable in view of a defoaming effect and high compatibility to the ink.

An amount of the foam inhibitor relative to a total amount of the ink is preferably 0.01% by mass or greater but 10% by mass or less, and more preferably 0.1% by mass or greater but 5% by mass or less. When the amount of the foam inhibitor is 0.01% by mass or greater, an effect of inhibiting foaming can be obtained. When the amount of the foam inhibitor is 10% by mass or less, excellent foam inhibiting performance can be obtained, and appropriate physical properties of the ink, such as viscosity, and particle diameters, can be obtained.

—Water-Dispersible Resin—

The water-dispersible resin has excellent film formability (image formability), high water repellency, high water resistance, and high weather resistance, and is effective for printing images of high water resistance and high image density (excellent coloring).

Examples of the water-dispersible resin include condensation-based synthetic resins, addition-based synthetic resins, and natural polymer compounds. The above-listed examples may be used alone or in combination.

Examples of the condensation-based synthetic resins include polyester resins, polyurethane resins, polyepoxy resins, polyamide resins, polyether resins, poly(meth)acrylic resins, acryl-silicone resins, and fluororesins Examples of the addition-based synthetic resins include polyolefin resins, polystyrene-based resins, polyvinyl alcohol-based resins, polyvinyl ester-based resins, polyacrylic acid-based resins, and unsaturated carboxylic acid-based resin.

Examples of the natural polymer compounds include cellulose, rosins, and natural rubber.

Among the above-listed examples, a fluororesin and an acryl-silicone resin are preferable.

The fluororesin is preferably a fluororesin having a fluoroolefin unit, and more preferably a fluorine-containing vinyl ether-based resin composed of a fluoroolefin unit and a vinyl ether unit.

The fluoroolefin unit is not particularly limited and may be appropriately selected depending on the intended purpose. Examples of the fluoroolefin unit include —$CF_2CF_2$—, —$CF_2CF(CF_3)$—, and —$CF_2CFCl$—.

The vinyl ether unit is not particularly limited and may be appropriately selected depending on the intended purpose. Examples of the vinyl ether unit include compounds represented by structural formulae below.

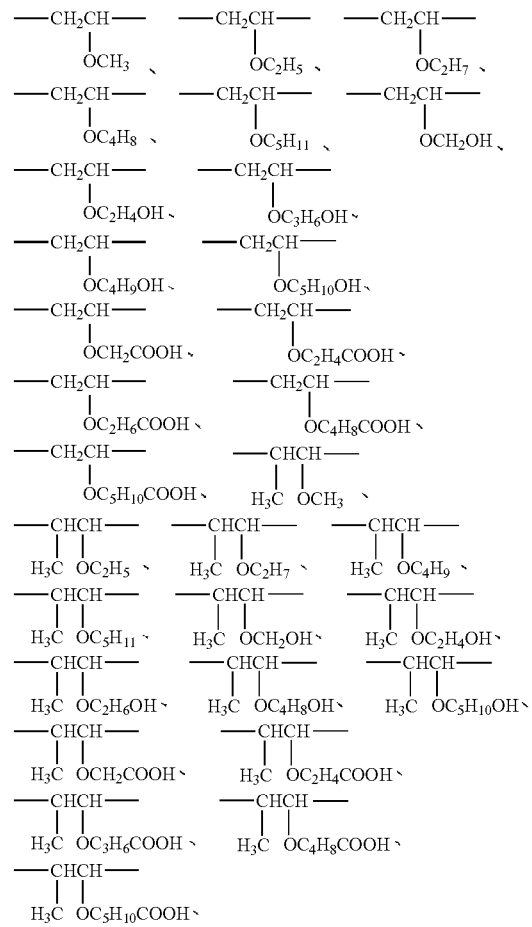

The fluorine-containing vinyl ether-based resin composed of the fluoroolefin unit and the vinyl ether unit is preferably an alternating copolymer prepared by alternating copolymerizing the fluoroolefin unit and the vinyl ether unit.

Such a fluororesin may be appropriately synthesized for use or selected from commercial products. Examples of the commercial products include: FLUONATE FEM-500, FLUONATE FEM-600, DIC GUARD F-52S, DIC GUARD F-90, DIC GUARD F-90M, DIC GUARD F-90N, and AQUAFURAN TE-5A, all available from DIC Corporation; and LUMIFLON FE4300, LUMIFLON FE4500, LUMIFLON FE4400, ASAHIGUARD AG-7105, ASAHIGUARD AG-950, ASAHIGUARD AG-7600, ASAHIGUARD AG-7000, and ASAHIGUARD AG-1100, all available from ASAHI GLASS CO., LTD.

The water-dispersible resin may be used as a homopolymer, may be copolymerized to use as a composite resin, or may be used as a single-phase structure-, core-shell, or power-feed emulsion.

As the water-dispersible resin, a resin, which itself has hydrophilic groups and self-dispersibility, and a resin, which does not dispersibility itself but has dispersibility imparted by a surfactant or a resin including hydrophilic groups, can be used. Among the above-listed examples, an emulsion of resin particles obtained by emulsifying or suspension-polymerizing an iomer or unsaturated monomers of a polyester resin or a polyurethane resin is most suitable. In case of emulsion polymerization of an unsaturated monomer, a resin emulsion is obtained through a reaction performed in water, to which the unsaturated monomer a polymerization initiator, a surfactant, a chain-transfer agent, a chelating agent, and a pH regulator. Therefore, a water-dispersible resin can be easily obtained, and intended properties of the resin are easily obtained because a structure of the resin is easily changed.

For example, as the unsaturated monomer, unsaturated carboxylic acids, monofunctional or polyfunctional (meth) acrylate monomers, (meth)acrylic acid amide monomers, aromatic vinyl monomers, vinyl cyano compound monomers, vinyl monomers, allyl compound monomers, olefin monomers, diene monomers, or oligomers including unsaturated carbon can be used alone or in combination. Use of the above-listed monomers in combination can flexibly modify properties of a resultant resin, and the properties of the resin can be modified by performing a polymerization reaction or graft reaction using an oligomer-based polymerization initiator.

Examples of the unsaturated carboxylic acids include acrylic acid, methacrylic acid, itaconic acid, fumaric acid, and maleic acid.

Examples of the monofunctional (meth)acrylate monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethylmethacrylate, 2-hydroxypropylmethacrylate, dimethylaminoethyl methacrylate, methacryloxyethyltrimethyl ammonium salt, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexylacrylate, octyl acrylate, decyl acrylate, dodecyl acrylate, octadecyl acrylate, cyclohexyl acrylate, phenyl acrylate, benzyl acrylate, glycidyl acrylate, 2-hydroxyethylacrylate, 2-hydroxypropylacrylate, dimethylaminoethyl acrylate, and acryloxyethyltrimethyl ammonium salt.

Examples of the polyfunctional (meth)acrylate monomers include ethylene glycol dimethacrylate, diethylene glycol dimethacrylate, triethylene glycol dimethacrylate, polyethylene glycol dimethacrylate, 1,3-butyleneglycoklimethacrylate, 1,4-butyleneglycoldimethacrylate, 1,6-hexanediokli- methacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylolpropane trimethacrylate, trimethylolethane trimethacrylate, polyethylene glycol diacrylate, triethylene glycol diacrylate, 1,3-butyleneglycokliacrylate, 1,4-butyleneglycokliacrylate, 1,6-hexanedioldiacrylate, neopentyl glycol diacrylate, 1,9-nonanedioldiacrylate, polypropylene glycol diacrylate, 2,2'-bis(4-acryloxypropoxyphenyl)propane, 2,2'-bis(4-acryloxydiethoxyphenyl)propanetrimethylolpropanetriacrylate, trimethylolethane triacrylate, tetramethylolmethane triacrylate, ditrimethylol tetraacrylate, tetramethylolmethane tetraacrylate, pentaerythritol tetraacrylate, and dipentaerythritol hexacrylate.

Examples of the (meth)acrylic acid amide monomers include acryl amide, methacryl amide, N,N-dimethylacrylamide, methylene bisacryl amide, and 2-acrylamide-2-methylpropane sulfonic acid.

Examples of the aromatic vinyl monomers include styrene, α-methyl styrene, vinyl toluene, 4-t-butylstyrene, chlorostyrene, vinyl anisole, vinyl naphthalene, and divinyl benzene.

Examples of the vinylcyano compound monomers include acrylonitrile and methacrylonitrile.

Examples of the vinyl monomers include vinyl acetate, vinylidene chloride, vinyl chloride, vinyl ether, vinyl ketone, vinyl pyrrolidone, vinyl sulfonic acid and salts thereof, vinyl trimethoxysilane, and vinyl triethoxy silane.

Examples of the allyl compound monomers include allyl sulfonic acid and salts thereof, allyl amine, allyl chloride, diallyl amine, and diallyldimethyl ammonium salt.

Examples of the olefin monomers include ethylene and propylene.

Examples of the diene monomers include butadiene and chloroprene.

Examples of the oligomer including unsaturated carbon include a styrene oligomer including a methacryloyl group, a styrene-acrylonitrile oligomer including a methacryloyl group, a methyl methacrylate oligomer including a methacryloyl group, a dimethyl siloxane oligomer including a methacryloyl group, and a polyester oligomer including an acryloyl group.

The water-dispersible resin causes disturbance of dispersion or molecular-chain scission under strong alkaline or acidic conditions. Therefore, pH of the water-dispersible resin is preferably 4 or higher but 12 or lower. Especially in view of compatibility with a water-dispersible colorant, pH of the water-dispersible resin is more preferably 6 or higher but 11 or lower, and even more preferably 7 or higher but 10 or lower.

A volume average particle diameter of the water-dispersible resin is related to a viscosity of a dispersion liquid. With the same composition, a viscosity with the identical solid content increases, as the particle diameter decreases. In order to prevent an excessively high viscosity when an ink is prepared, the volume average particle diameter of the water-dispersible resin is preferably 50 nm or greater.

When the particle diameters are several tens nanometers, the particles of the water-dispersible resin are larger than the openings of the nozzles of the inkjet head, and therefore such a water-dispersible resin cannot be used. When the large number of large particles are present in the ink, even though the particle diameters of the particles are smaller than the openings of the nozzles, ejectability of the ink is impaired. Accordingly, the volume average particle diameter of the particles of the water-dispersible resin is preferably 200 nm or smaller, and more preferably 150 nm or smaller, in order to maintain ejectability of the ink.

The water-dispersible resin preferably has a function for fixing the colorant on a surface of paper to form a film at normal temperature to thereby improve fixability of the colorant. Accordingly, a minimum film forming temperature (MFT) of the water-dispersible resin is preferably 30° C. or lower. When glass transition temperature of the water-dispersible resin is −40° C. or lower, moreover, viscosity of the resin film is strong and tackiness is formed on a printed product. Therefore, glass transition temperature of the water-dispersible resin is preferably −30° C. or higher.

An amount of the water-dispersible resin based on the solid content is preferably 0.5% by mass or greater but 10% by mass or less, and more preferably 1% by mass or greater but 8% by mass or less, relative to a total amount of the ink.

—pH Regulator—

The pH regulator is not particularly limited and may be appropriately selected depending on the intended purpose, as long as the pH regulator can adjust pH to a range from 7 through 11 without adversely affecting an ink to be formulated. Examples of the pH regulator include alcohol amines, hydroxides of alkali metal elements, hydroxides of ammonium, phosphonium hydroxide, and carbonates of alkali metals. When the pH is lower than 7 or higher than 11, an amount of the inkjet head or ink supply unit dissolved by the ink is large, which may cause problems, such as modification or leakage of the ink, and ejection failures.

Examples of the alcohol amines include diethanol amine, triethanol amine, and 2-amino-2-ethyl-1,3-propanediol.

Examples of the hydroxides of alkali metal elements include lithium hydroxide, sodium hydroxide, and potassium hydroxide.

Examples of the hydroxide of ammonium include ammonium hydroxide, and quaternary ammonium hydroxide.

Examples of the phosphonium hydroxide include quaternary phosphonium hydroxide.

Examples of the carbonates of alkali metals include lithium carbonate, sodium carbonate, and potassium carbonate.

—Preservative and Fungicide—

Examples of the preservative and fungicide include sodium dehydroacetate, sodium sorbate, sodium 2-pyridinethiol-1-oxide, sodium benzoate, and pentachlorophenol sodium salt.

—Chelate Reagent—

Examples of the chelate reagent include sodium ethylenediamine tetraacetate, sodium nitrilotriacetate, sodium hydroxyethylethylenediamine triacetate, sodium diethylenetriamine pentaacetate, and sodium uramil diacetate.

—Corrosion Inhibitor—

Examples of the corrosion inhibitor include acid sulfite, sodium thiosulfate, ammonium thiodiglycolate, diisopropyl ammonium nitrite, pentaerythritol tetranitrate, and dichlorohexyl ammonium nitrite.

—Antioxidant—

Examples of the antioxidant include a phenol-based antioxidants (including hindered phenol-based antioxidants), amine-based antioxidants, sulfur-based antioxidants, and phosphorus-based antioxidants.

—Production Method of Ink—

The ink is produced by dispersing or dissolving, in water, the colorant, the organic solvent, the surfactant, and optionally the above-mentioned other ingredients, and optionally stirring and mixing the mixture. The stirring and mixing can be performed, for example, by means of a sand mill, a homogenizer, a ball mill, a paint shaker, an ultrasonic disperser, a stirrer using a stirring blade, a magnetic stirrer, and a high-speed disperser.

—Physical Properties of Ink—

Physical properties of the ink are not particularly limited and may be appropriately selected depending on the intended purpose. For example, a viscosity, surface tension, etc. of the ink are preferably in ranges described below.

The viscosity of the ink at 25° C. is preferably 5 mPa·s or higher but 25 mPa·s or lower, and more preferably 6 mPa·s or higher but 20 mPa·s or lower. Since the viscosity of the ink is 5 mPa·s or higher, an effect of improving printing density or quality of printed character can be obtained. Since the viscosity of the ink is 25 mPa·s or lower, ejectability of the ink can be ensured.

The viscosity can be measured at 25° C., for example, by means of a viscometer (RE-550L, available from TOKI SANGYO CO., LTD.).

The ink is suitably used for inkjet printing, or spray coating.

The ink for inkjet printing can be suitably used for a printer equipped with any of the following inkjet heads. Namely, there are a piezo inkjet head where a piezoelectric element is used as a pressure generating unit configured to press an ink in an ink flow path, and the piezoelectric element is used to deform a diaphragm forming a wall surface of the ink flow path to change an internal volume of the ink flow path to eject ink droplets (see Japanese Unexamined Patent Application Publication No. 02-51734), a thermal inkjet head where an ink in an ink flow path is heated by using a heat resistor to generate bubbles (see Japanese Unexamined Patent Application Publication No. 61-59911), and an electrostatic inkjet head where a diaphragm forming a wall surface of an ink flow path and an electrode are arranged to face each other, and the diaphragm is deformed by an electrostatic force generated between the diaphragm and the electrode to change an internal volume of the ink flow path to thereby eject ink droplets (see Japanese Unexamined Patent Application Publication No. 06-71882).

The printing device of the present disclosure include the inkjet head, and an ink-stored container having an ink accommodating unit in which the ink is accommodated, and may further include other units according to the necessity.

<Ink-Stored Container>

The ink-stored container includes an ink, and a container accommodating the ink, and may further include appropriately selected other members according to the necessity.

The container is not particularly limited, and a shape, structure, size, and material of the container are appropriately selected depending on the intended purpose. For example, the container is preferably a container including at least an ink bag formed of an aluminium laminate film or a resin film.

Figure 4:
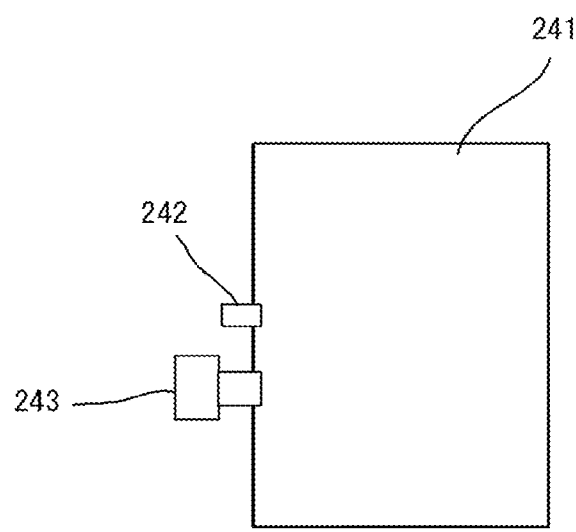
FIG. 4 is a schematic view illustrating one example of an ink-stored container.
Figure 5:
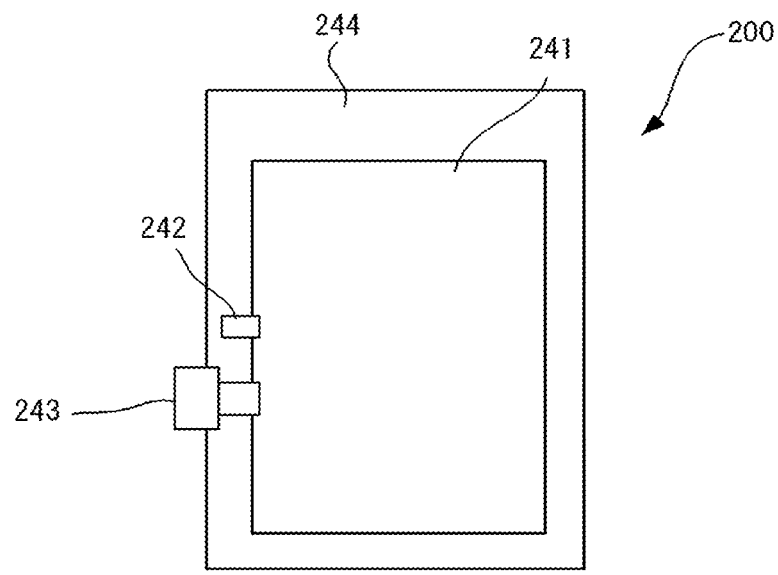
FIG. 5 is a schematic view including a case of the ink-stored container of FIG. 4.

Next, the ink-stored container is described with reference to FIGS. 4 and 5. FIG. 4 is a view illustrating one example of the ink-stored container, and FIG. 5 is a view including a case (exterior) of the ink-stored container of FIG. 4.

As illustrated in FIG. 4, the ink-stored container 200 include an ink bag 241, into which an ink is introduced from an ink inlet 242, and the ink inlet 242 is fused after removing air from the ink bag 241. At the time of use, the ink is supplied to a device by inserting a needle of the device main body into an ink outlet 243 formed of a rubber member.

The ink bag 241 is formed of a non-permeable wrapping member, such as an aluminium laminate film. As illustrated in FIG. 5, the ink bag 241 is typically accommodated inside an accommodating container case 244 formed of a plastic, and the ink-stored container is used by being detachably mounted in various printing devices.

<Other Steps and Other Units>

The above-mentioned other steps are not particularly limited and may be appropriately selected depending on the intended purpose, and examples of other steps include a controlling step.

The above-mentioned other units are not particularly limited and may be appropriately selected depending on the intended purpose, and examples of other units include a controlling unit.

—Controlling Step and Controlling Unit—

The controlling step is controlling each of the steps, and is performed by a controlling unit.

The controlling unit is not particularly limited and may be appropriately selected depending on the intended purpose, as long as the controlling unit is capable of controlling operations of each unit. Examples of the controlling unit include devices such as sequencers and computers.

One embodiment for carrying out the printing method of the present disclosure by the printing device of the present disclosure is described with reference to drawings.

Figure 6:
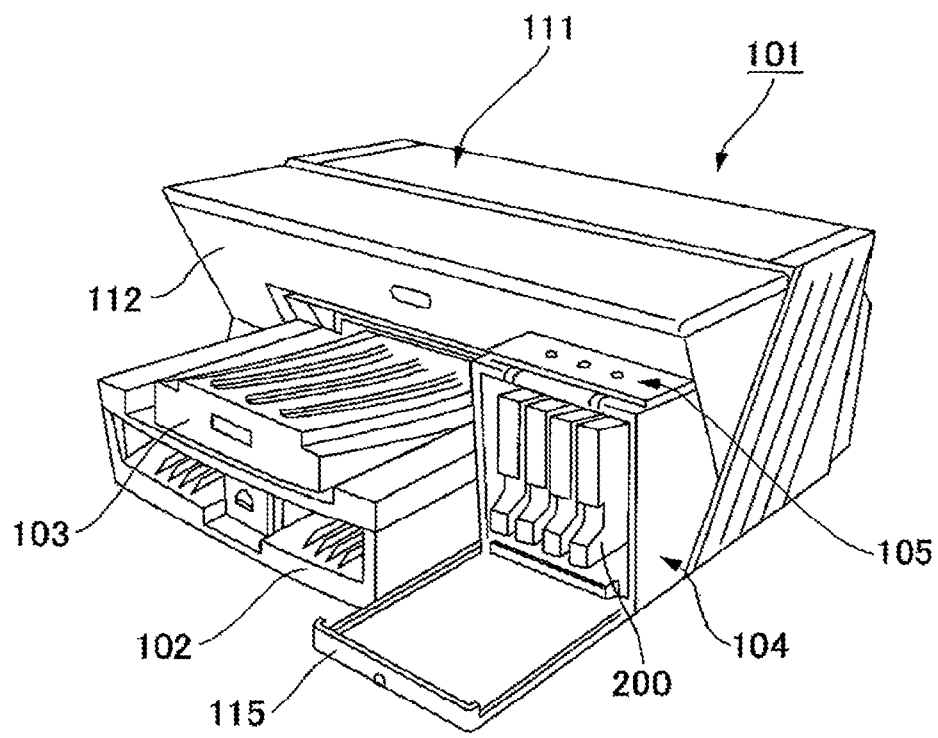
FIG. 6 is a perspective view illustrating one example of a printing device.

The printing device illustrated in FIG. 6 include a device main body 101, a paper feeding tray 102, which is mounted in the device main body 101 and is configured to feed sheets, a paper ejection tray 103, which is mounted in the device main body 101 and is configured to stock sheets to which images have been printed (formed), and an ink-stored container loading unit 104. Various types of printing media can be fed using the paper feeding tray 102.

A control unit 105, such as control keys and a display, is disposed on a top surface of the ink-stored container loading unit 104. The ink-stored container loading unit 104 has a front cover 115 that can be open and closed in order to replace the ink-stored container 200.

Figure 7:
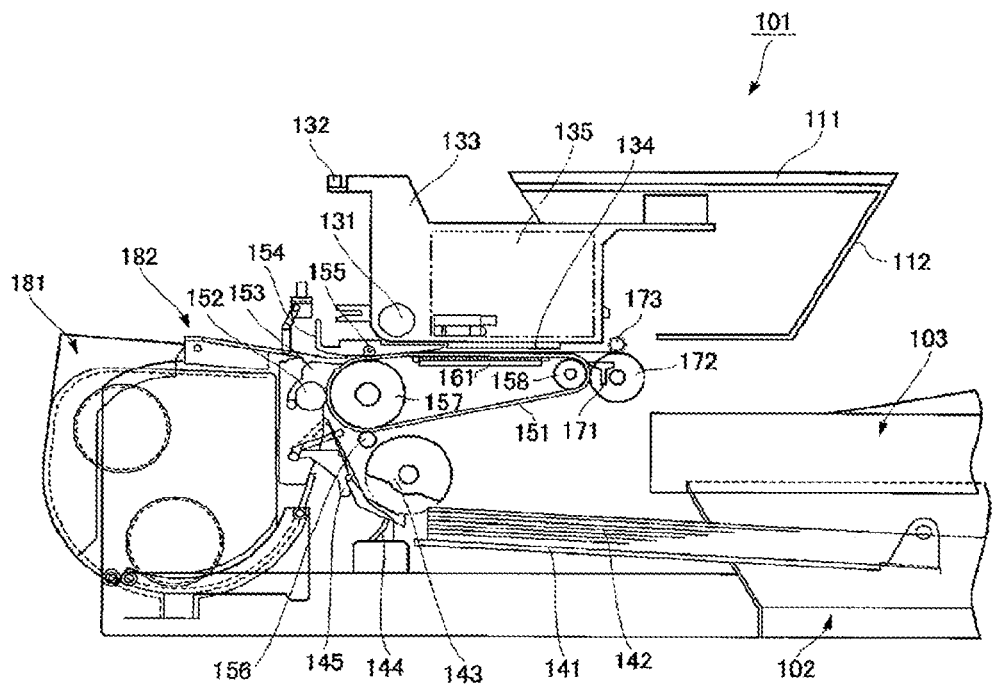
FIG. 7 is a schematic view illustrating another example of a printing device.
Figure 8:
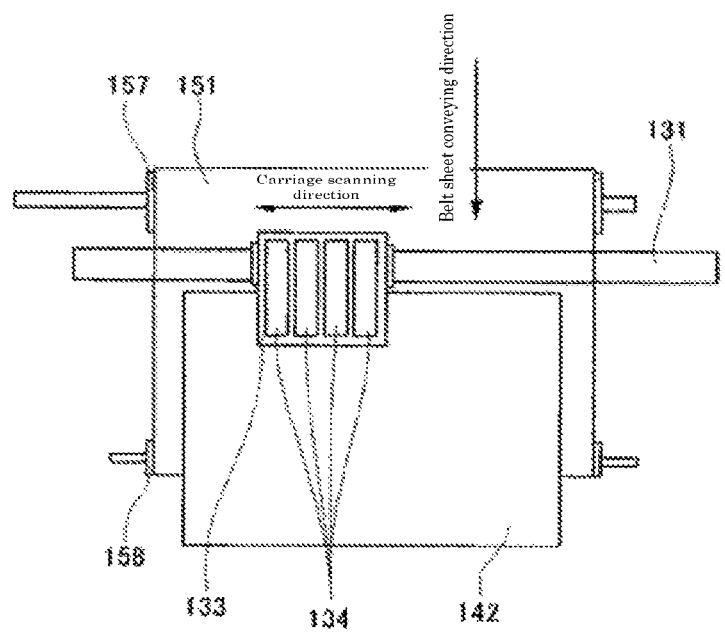
FIG. 8 is a schematic enlarged view illustrating one example of an inkjet head of a printing device.

As illustrated in FIGS. 7 and 8, inside the device main body 101, a carriage 133 is slidably held in a main scanning direction with a guide rod 131 that is a guide member laterally bridged to right and left side boards (not illustrated) and a stay 132, and the carriage 133 is run and scanned in the direction indicated with an arrow in FIG. 5 by a main scanning motor (not illustrated).

In the carriage 133, four inkjet heads 134, which respectively eject droplets of yellow (Y), cyan (C), magenta (M), and black (Bk), are mounted in a manner that a plurality of ink ejection openings are aligned in the direction orthogonal to the main-scanning direction, and the direction for ejecting the ink is arranged downwards.

As the inkjet liquid ejection heads constituting the liquid ejection head 134, usable are heads each equipped with an energy generating unit for ejecting an ink, such as a piezoelectric actuator (e.g., a piezoelectric element), a thermal actuator utilizing a phase change caused by film boiling of a liquid using an electrothermal energy conversion element (e.g., a heat resistor), a shape-memory alloy actuator utilizing a metal phase change due to a temperature change, and an electrostatic actuator utilizing an electrostatic force.

Moreover, a subtank 135 of each color configured to supply an ink of each color to the inkjet head 134 is mounted in the carriage 133. The subtank 135 is refilled by supplying the ink from the ink-stored container 200 mounted in the ink-stored container loading unit 104, through an ink supply tube (not illustrated).

As a paper feeding unit configured to feed sheets 142 loaded on a paper loading unit (pressure plate) 141 of the paper feeding tray 102, a semicircular roller (paper feeding roller 143) configured to separate and feed the sheets 142 one by one from the paper loading unit 141, and a separation pad 144, which is disposed to face the paper feeding roller 143 and is formed of a material having a large friction coefficient, are equipped. The separation pad 144 is pressed against the paper feeding roller 143.

As a conveying unit configured to convey the sheet 142 fed from the paper feeding unit below the inkjet head 134, a conveying belt 151 configured to convey the sheet 142 with an electrostatic attraction, a counter roller 152 configured to nip the sheet 142, which is sent from the paper feeding unit through a guide 145, between the counter roller 152 and the conveying belt 151 to convey the sheet 142, a conveying guide 153 configured to change the direction of the sheet 142 sent substantially vertically upwards by about 90° to allow the sheet 142 move along the conveying belt 151, and an edge press roller 155 pressed against the conveying belt 151 by a pressing member 154 are equipped. Moreover, a charging roller 156, which is a charging unit configured to charge a surface of the conveying belt 151, is equipped.

The conveying belt 151 is an endless belt, and passed between a conveying roller 157 and a tension roller 158, and is rotatable in the belt conveying direction. The conveying belt 151 is an endless belt, and passed between a conveying roller 157 and a tension roller 158, and is rotatable in the belt conveying direction. The conveying belt 151 has a surface layer, which is formed of a resin material (e.g., a tetrafluoroethylene-ethylene copolymer (ETFE)) having a thickness of about 40 μm, where resistance of the resin material is not controlled, and is to be a sheet adhesion surface, and a back surface (e.g., a medium resistance layer, and an earth layer) formed of a material identical to the material of the surface layer, and resistance of which has been controlled. At the back side of the conveying belt 151, a guide member 161 is arranged to correspond to an ejection region of the inkjet head 134. As a paper ejection unit configured to eject the sheet 142, which has been printed by the inkjet head 134, a separation claw 171 configured to separate the print medium 142 from the conveying belt 151, a paper ejection roller 172, and a paper ejection roller 173 are equipped. The paper ejection tray 103 is disposed below the paper ejection roller 172.

At the rear of the device main body 101, a double-sided paper feeding unit 181 is detachably mounted. The double-sided paper feeding unit 181 is configured to takes in the sheet 142, which has been returned with a rotation in the reverse direction of the conveying belt 151, and to flip the sheet 142 and again feed between the counter roller 152 and the conveying belt 151. Note that, a manual paper feeding unit 182 is disposed on the top surface of the double-sided paper feeding unit 181.

Within the image forming device, the sheets 142 are separated and fed one by one from the paper feeding unit, the sheet 142 fed substantially vertically upwards is guided by the guide 145, and the sheet 142 is conveyed in the state that the sheet 142 is nipped between the conveying belt 151 and the counter roller 152. Moreover, the edge of the sheet 142 is guided by the conveying guide 153, and is pressed against the conveying belt 151 with the edge press roller 155 to change the conveying direction by about 90°.

During the process as mentioned, the conveying belt 151 is charged by the charging roller 156, and the sheet 142 is conveyed by electrostatically adhering the sheet 142 on the conveying belt 151. Then, ink droplets are ejected on the stopped sheet 142 to print for 1 line by driving the inkjet head 134 according to the image signal with moving the carriage 133, and then the sheet 142 is conveyed by a predetermined distance followed by printing for a next line. When a print terminating signal or a signal indicating that a rear edge of the sheet 142 reaches the printing region is received, a printing operation is finished, and the sheet 142 is ejected to the paper ejection tray 103.

When a remained amount of the ink inside the subtank 135 is detected to be almost empty, a predetermined amount of the ink is supplied to the subtank 135 from the ink-stored container 200.

In the printing device, a housing of the ink-stored container 200 is dismantled and only an ink bag present inside can be replaced when the ink in the ink-stored container 200 is run out. Moreover, the ink-stored container 200 can stably supply the ink even when the ink-stored container 200 is mounted vertically, and loaded from the front side. Even in the case where the device main body 101 is installed with the upper side of the body being blocked, such as a case where the device main body 101 is stored in a rack or an object is placed on a top surface of the device main body 101, therefore, the ink-stored container 200 can be easily replaced.

Note that, an example where the present disclosure is applied to a serial-type (shuttle-type) image forming device is described in the embodiment above, but the present disclosure is similarly applied to a line-type image forming device equipped with a line-type head.

The printing device and printing method of the present disclosure can be applied for various types of printing performed by an inkjet printing system. For example, the printing device and printing method of the present disclosure can be particularly suitably applied for inkjet printing printers, facsimiles, photocopiers, and printer/fax/photocopier multifunction peripherals.

The printing device and printing method of the present disclosure are not particularly limited and may be appropriately selected depending on the intended purpose. For example, the printing device and printing method of the present disclosure can be applied on printed matter, paints, coating materials, and primers. Moreover, the printing device and printing method of the present disclosure can be used as three-dimensional modeling devices and three-dimensional modeling methods for forming three-dimensional objects (three-dimensional models), as well as being used for forming two-dimensional characters and images.

EXAMPLES

The present disclosure will be described below more specifically by way of Examples. The present disclosure should not be construed as being limited to the Examples.

Preparation Example 1

—Preparation of Surface-Modified Black Pigment Dispersion (1)—

In the environment having room temperature, 100 g of Black Pearls (registered trademark) 1000 (carbon black having BET specific surface area of 343 $m^2/g$, and DBPA of 105 mL/100 g) available from Cabot Corporation, 100 mmol of sulfanilic acid, and 1 L of ion-exchanged ultrapure water were mixed by means of Silverson mixer (6,000 rpm).

When pH of the obtained slurry was higher than 4, 100 mmol of nitric acid was added. Thirty minutes later, to the resultant mixture, sodium nitrite (100 mmol) dissolved in a small amount of ion-exchanged pure water was gradually added. Moreover, the resultant was heated at 60° C. with stirring to allow to react for 1 hour, to thereby generate a modified pigment, in which sulfanilic acid had been added to the carbon black.

Next, pH of the modified pigment was adjusted to 9 with a 10% by mass tetrabutyl ammonium hydroxide solution (methanol solution). Thirty minutes later, modified pigment dispersion was obtained.

Next, ultrafiltration using a dialysis membrane was performed with the obtained modified pigment dispersion bonded to at least either of a sulfanilic acid group or tetrabutyl ammonium sulfanilic acid salt and ion-exchanged ultrapure water. Moreover, the resultant was subjected to ultrasonic dispersion to thereby obtain modified pigment dispersion, a pigment solid content of which had been concentrated to 20% by mass.

The level of the surface treatment of the obtained modified pigment dispersion was 0.75 mmol/g. The modified pigment dispersion was subjected to a measurement by a particle size distribution analyzer (NANOTRACK UPA-EX150, available from Nikkiso Co., Ltd.), and a volume average particle diameter of the modified pigment dispersion was 120 nm.

Preparation Example 2

—Preparation of Surface Modified Black Pigment Dispersed Element (2)—

ProcessAll 4HV Mixer (4 L) was charged with 500 g of Black Pearls (registered trademark) 880 (carbon black having BET specific surface area of 220 $m^2/g$ and DBPA of 105 mL/100 g) available from Cabot Corporation, 1 L of ion-exchanged pure water, and 1 mol of 4-aminobenzoic acid. Next, the resultant mixture was strongly mixed for 10 minutes at 300 rpm with heating at 60° C. To the resultant, a 20% by mass sodium nitrite aqueous solution [1 mol equivalent based on 4-aminobenzoic acid] was added over 15 minutes. The resultant was mixed and stirred for 3 hours with heating at 60° C. The resultant reaction product was collected by diluting with 750 mL of ion-exchanged ultrapure water.

Next, pH of the resultant was adjusted to 9 with a 10% by mass tetrabutyl ammonium hydroxide solution (methanol solution). Thirty minutes later, modified pigment dispersion was obtained.

Next, ultrafiltration using a dialysis membrane was performed with the obtained modified pigment dispersion including the pigment bonded to at least either of an aminobenzoic acid group or tetrabutyl ammonium aminobenzoic acid salt and ion-exchanged ultrapure water. Moreover, the resultant was subjected to ultrasonic dispersion to thereby obtain modified pigment dispersion, a pigment solid content of which had been concentrated to 20% by mass.

The level of the surface treatment of the obtained modified pigment dispersion was 0.5 mmol/g. The modified pigment dispersion was subjected to a measurement by a particle size distribution analyzer (NANOTRACK UPA-EX150, available from Nikkiso Co., Ltd.), and a volume average particle diameter of the modified pigment dispersion was 104 nm.

Preparation Example 3

—Preparation of Surface Modified Black Pigment Dispersed Element (3)—

ProcessAll 4HV Mixer (4 L) was charged with 500 g of Black Pearls (registered trademark) 880 (carbon black having BET specific surface area of 220 $m^2/g$ and DBPA of 105 mL/100 g) available from Cabot Corporation, 1 L of ion-exchanged pure water, and 175 mmol of 4-aminobenzoic acid. Next, the resultant mixture was strongly mixed for 10 minutes at 300 rpm with heating at 60° C. To the resultant, a 20% by mass sodium nitrite aqueous solution [175 mmol equivalent based on 4-aminobenzoic acid] was added over 15 minutes. The resultant was mixed and stirred for 3 hours with heating at 60° C. The resultant reaction product was collected by diluting with 750 mL of ion-exchanged ultrapure water.

Next, pH of the resultant was adjusted to 9 with a 10% by mass tetraethyl ammonium hydroxide aqueous solution. Thirty minutes later, modified pigment dispersion was obtained.

Next, ultrafiltration using a dialysis membrane was performed with the obtained modified pigment dispersion including the pigment bonded to at least either of an aminobenzoic acid group or tetraethyl ammonium aminobenzoic acid salt and ion-exchanged ultrapure water. Moreover, the resultant was subjected to ultrasonic dispersion to thereby obtain modified pigment dispersion, a pigment solid content of which had been concentrated to 20% by mass.

The level of the surface treatment of the obtained modified pigment dispersion was 0.35 mmol/g. The modified pigment dispersion was subjected to a measurement by a particle size distribution analyzer (NANOTRACK UPA-EX150, available from Nikkiso Co., Ltd.), and a volume average particle diameter of the modified pigment dispersion was 114 nm.

Preparation Example 4

—Preparation of Surface Modified Black Pigment Dispersion (4)—

Self-dispersible carbon black Aqua-Black 162 (available from TOKAI CARBON CO., LTD., pigment solid content: 19.2% by mass) pigment dispersion (1 kg) was subjected to acid deposition using a 0.1 N HCl aqueous solution. Subsequently, pH of the resultant was adjusted to 9 with a 40% by mass benzyltrimethyl ammonium hydroxide solution (methanol solution). Thirty minutes later, modified pigment dispersion was obtained.

Next, ultrafiltration using a dialysis membrane was performed with the obtained modified pigment dispersion including the pigment bonded to at least either of a carboxylic acid group or benzyltrimethyl ammonium carboxylic acid salt and ion-exchanged ultrapure water. Moreover, the resultant was subjected to ultrasonic dispersion to thereby obtain modified pigment dispersion, a pigment solid content of which had been concentrated to 20% by mass.

The obtained modified pigment dispersion was subjected to a measurement by a particle size distribution analyzer (NANOTRACK UPA-EX150, available from Nikkiso Co., Ltd.), and a volume average particle diameter of the modified pigment dispersion was 100 nm.

Preparation Example 5

—Preparation of Surface Modified Black Pigment Dispersion (5)—

SENSIJET Black SDP2000 (available from Sensient Technologies Corporation, pigment solid content: 14.5% by mass) pigment dispersion (1 kg) was subjected to acid deposition using a 0.1 N HCl aqueous solution. Subsequently, pH of the resultant was adjusted to 9 with a 10% by mass tetrabutyl ammonium hydroxide solution (methanol solution). Thirty minutes later, modified pigment dispersion was obtained.

Next, ultrafiltration using a dialysis membrane was performed with the obtained modified pigment dispersion including the pigment bonded to at least either of a carboxylic acid group or tetrabutyl ammonium carboxylic acid salt, and a sulfonic acid group or tetrabutyl ammonium sulfonic acid salt, and ion-exchanged ultrapure water. Moreover, the resultant was subjected to ultrasonic dispersion to thereby obtain modified pigment dispersion, a pigment solid content of which had been concentrated to 20% by mass.

The obtained modified pigment dispersion was subjected to a measurement by a particle size distribution analyzer (NANOTRACK UPA-EX150, available from Nikkiso Co., Ltd.), and a volume average particle diameter of the modified pigment dispersion was 120 nm.

Preparation Example 6

—Preparation of Surface Modified Magenta Pigment (1)—

SENSIJET SMART Magenta 3122BA (surface-treated Pigment Red 122 dispersion, pigment solid content: 14.5% by mass, available from Sensient Technologies Corporation) pigment dispersion (1 kg) was subjected to acid deposition using a 0.1 N HCl aqueous solution. Subsequently, pH of the resultant was adjusted to 9 with a 10% by mass tetraethyl ammonium hydroxide aqueous solution. Thirty minutes later, modified pigment dispersion was obtained.

Next, ultrafiltration using a dialysis membrane was performed with the obtained modified pigment dispersion including the pigment bonded to at least either of an aminobenzoic acid group or tetraethyl ammonium aminobenzoic acid salt, and ion-exchanged ultrapure water, followed by ultrasonic dispersion, to thereby obtain modified pigment dispersion, a pigment solid content of which had been concentrated to 20% by mass.

The obtained modified pigment dispersion was subjected to a measurement by a particle size distribution analyzer (NANOTRACK UPA-EX150, available from Nikkiso Co., Ltd.), and a volume average particle diameter of the modified pigment dispersion was 104 nm.

Preparation Example 7

—Preparation of Surface Modified Cyan Pigment Dispersion (1)—

SENSIJET SMART Cyan 3154BA (surface-treated Pigment Blue 15:4 dispersion, pigment solid content: 14.5% by mass, available from Sensient Technologies Corporation) pigment dispersion (1 kg) was subjected to acid deposition using a 0.1 N HCl aqueous solution. Subsequently, pH of the resultant was adjusted to 9 with a 40% by mass benzyltrimethyl ammonium hydroxide solution (methanol solution). Thirty minutes later, modified pigment dispersion was obtained.

Next, ultrafiltration using a dialysis membrane was performed with the obtained modified pigment dispersion including the pigment bonded to at least either of an aminobenzoic acid group or benzyltrimethyl ammonium aminobenzoic acid salt, and ion-exchanged ultrapure water. Moreover, ultrasonic dispersion was performed to thereby obtain modified pigment dispersion, a pigment solid content of which had been concentrated to 20% by mass.

The obtained modified pigment dispersion was subjected to a measurement by a particle size distribution analyzer (NANOTRACK UPA-EX150, available from Nikkiso Co., Ltd.), and a volume average particle diameter of the modified pigment dispersion was 116 nm.

Preparation Example 8

—Preparation of Surface Modified Yellow Pigment Dispersion (1)—

The pH of SENSIJET SMART Yellow 3074BA (surface-treated Pigment Yellow 74 dispersion, pigment solid content: 14.5% by mass, available from Sensient Technologies Corporation) was adjusted to 9 with a 10% by mass tetrabutyl ammonium hydroxide solution (methanol solution). Thirty minutes later, modified pigment dispersion was obtained.

Next, ultrafiltration using a dialysis membrane was performed with the obtained modified pigment dispersion including the pigment bonded to at least either of an aminobenzoic acid group or tetrabutyl ammonium aminobenzoic acid salt, and ion-exchanged ultrapure water, followed by ultrasonic dispersion, to thereby obtain modified pigment dispersion, a pigment solid content of which had been concentrated to 20% by mass.

The obtained modified pigment dispersion was subjected to a measurement by a particle size distribution analyzer (NANOTRACK UPA-EX150, available from Nikkiso Co., Ltd.), and a volume average particle diameter of the modified pigment dispersion was 145 nm.

Preparation Example 9

<Preparation of Carbon Black Pigment-Containing Polymer Particle Dispersion>

—Preparation of Polymer Solution A—

After sufficiently purging a 1 L flask equipped with a mechanical stirrer, a thermometer, a nitrogen gas inlet tube, a reflux condenser, and a dropping funnel with nitrogen gas, the flask was charged with 11.2 g of styrene, 2.8 g of acrylic acid, 12.0 g of lauryl methacrylate, 4.0 g of polyethylene glycol methacrylate, 4.0 g of styrene micromer (product name: AS-6, available from TOAGOSEI CO., LTD.), and 0.4 g of mercaptoethanol, and the resultant mixture was mixed and heated to 65° C.

Next, a mixed solution including 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (product name: AS-6, available from TOAGOSEI CO., LTD.), 3.6 g of mercaptoethanol, 2.4 g of azobismethyl valeronitrile, and 18 g of methyl ethyl ketone was dripped into the flask over 2.5 hours. After the dripping, a mixed solution including 0.8 g of azobismethyl valeronitrile and 18 g of methyl ethyl ketone was dripped into the flask over 0.5 hours. After maturing the resultant for 1 hour at 65° C., 0.8 g of azobismethyl valeronitrile was added, and the resultant mixture was further matured for 1 hour. After the termination of the reaction, 364 g of methyl ethyl ketone was added to the flask, to thereby obtain 800 g of a polymer solution A having a concentration of 50% by mass.

—Preparation of Carbon Black Pigment-Containing Polymer Particle Dispersion—

After sufficiently stirring 28 g of the polymer solution A, 42 g of C.I. Carbon Black (FW100, available from Degussa AG), 13.6 g of a 1 mol/L potassium hydroxide aqueous solution, 20 g of methyl ethyl ketone, and 13.6 g of ion-exchanged water, the resultant mixture was kneaded by a roll mill. The obtained paste was added to 200 g of pure water. After sufficiently stirring the resultant mixture, methyl ethyl ketone and water were removed by means of an evaporator. In order to remove coarse particles, the resultant dispersion liquid was subjected to pressure filtration using a polyvinylidene fluoride membrane filter having an average pore diameter of 5.0 µm to thereby obtain a carbon black pigment-containing polymer particle dispersion liquid having a pigment solid content of 15% by mass, and a solid content of 20% by mass.

The obtained polymer particles in the carbon black pigment-containing polymer particle dispersion liquid were subjected to a measurement by a particle size distribution analyzer (NANOTRACK UPA-EX150, available from Nikkiso Co., Ltd.), and a volume average particle diameter was 104 nm.

Preparation Example 10

—Preparation of Acryl-Silicone Polymer Particle Dispersion—

After sufficiently purging a 1 L flask equipped with a mechanical stirrer, a thermometer, a nitrogen gas inlet tube, a reflux condenser, and a dropping funnel with nitrogen gas, the flask was charged with 8.0 g of a reactive anionic surfactant (LATEMUL S-180, available from Kao Corporation) and 350 g of ion-exchanged water, and the resultant mixture was heated to 65° C. After the heating, 3.0 g of t-butylperoxybenzoate and 1.0 g of sodium isoascorbate serving as reaction initiators were added to the mixture. Five minutes later, 45 g of methyl methacrylate, 160 g of 2-ethylhexylmethacrylate, 5 g of acrylic acid, 45 g of butyl methacrylate, 30 g of cyclohexyl methacrylate, 15 g of vinyltriethoxy silane, 8.0 g of a reactive anionic surfactant (LATEMUL S-180, available from Kao Corporation), and 340 g of ion-exchanged water, and the resultant was dripped to the mixture above over 3 hours.

After heating and maturing the resultant for 2 hours at 80° C., the resultant was cooled down to normal temperature, and pH of the resultant was adjusted to in the range of from 7 through 8.

Next, ethanol was removed by means of an evaporator to adjust a moisture, to thereby produce 730 g of polymer particle dispersion of Production Example 1 having a solid content of 40% by mass.

The obtained polymer particle dispersion was subjected to a measurement by a particle size distribution analyzer (NANOTRACK UPA-EX150, available from Nikkiso Co., Ltd.), and a volume average particle diameter of the modified pigment dispersion was 125 nm.

Production Example 1

<Production of Ink>

A container equipped with a stirrer was charged with 20.00 parts by mass of 3-n-butoxy-N,N-dimethylpropaneamide represented by Structural Formula (1) below, 25.00 parts by mass of 1,2-propanediol, 2.00 parts by mass of 2,2,4-trimethyl-1,3-pentanediol, 1.00 part by mass of polyether-modified siloxane compound represented by Structural Formula (VII), and 0.50 parts by mass of 2,4,7,9-tetramethyldecane-4,7-diol, and the resultant mixture was homogeneously stirred for 30 minutes.

Next, 0.05 parts by mass of a fungicide (Proxel GXL, available from Avecia), 0.20 parts by mass of 2-amino-2-ethyl-1,3-propanediol, 37.50 parts by mass of the surface-modified black pigment dispersion 1 of Preparation Example 1, and a balance of pure water were added to the mixture so that a total of the mixture was to be 100 parts by mass. The resultant mixture was stirred for 60 minutes, to make a resultant ink homogeneous.

The obtained ink was subjected to pressure filtration with a polyvinylidene fluoride membrane filter having an average pore diameter of 1.2 μm to remove coarse particles and dusts to thereby produce an ink of Production Example 1.

Production Example 2

<Production of Ink>

A container equipped with a stirrer was charged with 40 parts by mass of 3-ethyl-3-hydroxymethyloxetane represented by Structural Formula (4) below, 2 parts by mass of 2,2,4-trimethyl-1,3-pentanediol, 2 parts by mass of a polyether-modified siloxane compound represented by Structural Formula (IX), and 0.5 parts by mass of 2,4,7,9-tetramethyldecane-4,7-diol, and the resultant mixture was homogeneously stirred for 30 minutes.

Next, 0.05 parts by mass of a fungicide (Proxel GXL, available from Avecia), 0.2 parts by mass of 2-amino-2-ethyl-1,3-propanediol, 37.5 parts by mass of surface-modified black pigment dispersion 1 of Preparation Example 1, and a balance of pure water added to the mixture. The resultant mixture was stirred for 60 minutes, to make a resultant ink homogeneous.

Moreover, 5 parts by mass of the acryl-silicone polymer particle dispersion of Preparation Example 10 was added to the ink, and the resultant ink was stirred for 30 minutes to make the ink homogeneous.

The obtained ink was subjected to pressure filtration with a polyvinylidene fluoride membrane filter having an average pore diameter of 1.2 μm to remove coarse particles and dusts to thereby produce an ink of Production Example 2.

Production Examples 3 to 22

An organic solvent, a surfactant, and a defoaming agent for compositions and in amounts presented in Tables 1 to 5 were mixed and stirred in the same manner as in Production Example 1 or 2. Subsequently, a fungicide, a pH regulator, and a colorant (pigment dispersion) were mixed and stirred. Optionally, a resin was further mixed and stirred to form a homogeneous ink The obtained ink was subjected to pressure filtration with a polyvinylidene fluoride membrane filter having an average pore diameter of 1.2 μm to remove coarse particles and dusts to thereby produce each of inks of Production Examples 3 to 22.

TABLE 1

| | Ingredients | Production Example | | | | |
|---|---|---|---|---|---|---|
| | | 1 | 2 | 3 | 4 | 5 |
| Colotant | Surface-modified black pigment dispersed elements (1) (Preparation Example 1) | 37.50 | 37.50 | — | — | — |
| | Surface-modified black pigment dispersed elements (2) (Preparation Example 2) | — | — | 37.50 | — | — |
| | Surface-modified black pigment dispersed elements (3) (Preparation Example 3) | — | — | — | 35.00 | — |
| | Surface-modified black pigment dispersed elements (4) (Preparation Example 4) | — | — | — | — | 37.50 |
| | Surface-modified black pigment dispersed elements (5) (Preparation Example 5) | — | — | — | — | — |
| | Surface-modified magenta pigment dispersed elements (1) (Preparation Example 6) | — | — | — | — | — |
| | Surface-modified cyan pigment dispersed elements (1) (Preparation Example 7) | — | — | — | — | — |
| | Surface-modified yellow pigment dispersed elements (1) (Preparation Example 8) | — | — | — | — | — |
| | SENSIJET SMART Magenta 3122BA (Na aminobenzoate) | — | — | — | — | — |
| | SENSIJET SMART Cyan 3154BA (Na aminobenzoate) | — | — | — | — | — |
| | SENSIJET SMART Yellow 3074BA (Na aminobenzoate) | — | — | — | — | — |
| | SENSIJET Black SDP2000 (Na carbonate and Na sulfonate) | — | — | — | — | — |
| | Carbon black pigment-containing polymer particle dispersed elements (Preparation Example 9) | — | — | — | — | — |
| Resin | Acryl-silicone polymer particle dispersed elements (Preparation Example 10) | — | 5.00 | — | 5.00 | 5.00 |
| | Fluororesin emulsion | — | — | 4.00 | — | — |
| Organic solvent | Structural Formula (I): 3-n-butoxy-N,N-dimethylpropaneamide (SP value: 9.03) | 20.00 | — | 30.00 | — | — |
| | Structural Formula (IV): 3-ethyl-3-hydroxylmethyloxetane (SP value: 11.3) | — | 40.00 | — | 42.00 | 30.00 |
| | 1,2-butanediol (SP value: 12.8) | — | — | 10.00 | — | 5.00 |
| | 1,2-propanediol (SP value: 13.5) | 25.00 | — | — | — | 5.00 |
| | Glycerin (SP value: 16.38) | — | — | — | — | — |
| | Triethylene glycol (SP value: 15.4) | — | — | — | — | — |
| | 2-ethyl-1,3-hexanediol (SP value: 10.6) | — | — | 2.00 | 2.00 | 2.00 |
| | 2,2,4-trimethyl-1,3-pentanediol (SP value: 10.8) | 2.00 | 2.00 | — | — | — |
| Surfactant | Structural Formula (VII): polyether modified siloxane compound | 1.00 | — | — | — | — |
| | Structural Formula (IX): polyether-modified siloxane compound | — | 2.00 | — | — | — |
| | Structural Formula (X): polyether-modified siloxane compound | — | — | 2.00 | — | — |
| | TEGO Wet 270 | — | — | — | 2.00 | — |
| | SILFACE SAG503A | — | — | — | — | 1.00 |
| | UNIDYNE DSN403N | — | — | — | — | — |
| | ZONYL FS-300 | — | — | — | — | — |
| | SUFYNOL 104E | — | — | — | — | — |
| | SOFTANOL EP-7025 | — | — | — | — | — |

TABLE 1-continued

|  | Ingredients | Production Example | | | | |
|---|---|---|---|---|---|---|
|  |  | 1 | 2 | 3 | 4 | 5 |
| Fungicide | Proxel GXL | 0.05 | 0.05 | 0.05 | 0.05 | 0.05 |
| Foam inhibitor (defoaming agent) | 2,4,7,9-tetramethyldecane-4,7-diol | 0.50 | 0.50 | — | — | 0.40 |
|  | 2,5,8,11-tetramethyldodecane-5,8-diol | — | — | 0.40 | 0.40 | — |
| pH regulator | 2-amino-2-ethyl-1,3-propanediol | 0.20 | 0.20 | 0.20 | 0.10 | 0.10 |
| Water | Pure water | balance | balance | balance | balance | balance |
|  | Total (% by mass) | 100 | 100 | 100 | 100 | 100 |

TABLE 2

|  | Ingredients | Production Example | | | | |
|---|---|---|---|---|---|---|
|  |  | 6 | 7 | 8 | 9 | 10 |
| Colotant | Surface-modified black pigment dispersed elements (1) (Preparation Example 1) | — | — | — | — | — |
|  | Surface-modified black pigment dispersed elements (2) (Preparation Example 2) | — | — | — | — | — |
|  | Surface-modified black pigment dispersed elements (3) (Preparation Example 3) | — | — | — | — | — |
|  | Surface-modified black pigment dispersed elements (4) (Preparation Example 4) | — | — | — | — | — |
|  | Surface-modified black pigment dispersed elements (5) (Preparation Example 5) | 37.50 | — | — | — | — |
|  | Surface-modified magenta pigment dispersed elements (1) (Preparation Example 6) | — | 35.00 | — | — | — |
|  | Surface-modified cyan pigment dispersed elements (1) (Preparation Example 7) | — | — | 22.50 | — | 22.5 |
|  | Surface-modified yellow pigment dispersed elements (1) (Preparation Example 8) | — | — | — | 22.50 | — |
|  | SENSIJET SMART Magenta 3122BA (Na aminobenzoate) | — | — | — | — | — |
|  | SENSIJET SMART Cyan 3154BA (Na aminobenzoate) | — | — | — | — | — |
|  | SENSIJET SMART Yellow 3074BA (Na aminobenzoate) | — | — | — | — | — |
|  | SENSIJET Black SDP2000 (Na carbonate and Na sulfonate) | — | — | — | — | — |
|  | Carbon black pigment-containing polymer particle dispersed elements (Preparation Example 9) | — | — | — | — | — |
| Resin | Acryl-silicone polymer particle dispersed elements (Preparation Example 10) | 5.00 | 5.00 | 5.00 | 5.00 | 5.00 |
|  | Fluororesin emulsion | — | — | — | — | — |
| Organic solvent | Structural Formula (I): 3-n-butoxy-N,N-dimethylpropaneamide (SP value: 9.03) | 30.00 | — | — | — | 39.00 |
|  | Structural Formula (IV): 3-ethyl-3-hydroxylmethyloxetane (SP value: 11.3) | — | 39.00 | 49.00 | 52.50 | — |
|  | 1,2-butanediol (SP value: 12.8) | — | — | — | — | — |
|  | 1,2-propanediol (SP value: 13.5) | 10.00 | — | — | — | 10.00 |
|  | Glycerin (SP value: 16.38) | — | — | — | — | — |
|  | Triethylene glycol (SP value: 15.4) | — | — | — | — | — |
|  | 2-ethyl-1,3-hexanediol (SP value: 10.6) | 1.00 | 2.00 | 2.00 | 2.00 | 2.00 |
|  | 2,2,4-trimethyl-1,3-pentanediol (SP value: 10.8) | — | — | — | — | — |
| Surfactant | Structural Formula (VII): polyether-modified siloxane compound | — | 2.00 | — | — | — |
|  | Structural Formula (IX): polyether-modified siloxane compound | — | — | 2.00 | — | — |
|  | Structural Formula (X): polyether-modified siloxane compound | — | — | — | 3.00 | — |
|  | TEGO Wet 270 | 3.00 | — | — | — | — |
|  | SILFACE SAG503A | — | — | — | — | 2.00 |
|  | UNIDYNE DSN403N | — | — | — | — | — |
|  | ZONYL FS-300 | — | — | — | — | — |
|  | SUFYNOL 104E | — | — | — | — | — |
|  | SOFTANOL EP-7025 | — | — | — | — | — |

TABLE 2-continued

|  | Ingredients | Production Example | | | | |
|---|---|---|---|---|---|---|
|  |  | 6 | 7 | 8 | 9 | 10 |
| Fungicide | Proxel GXL | 0.05 | 0.05 | 0.05 | 0.05 | 0.05 |
| Foam inhibitor (defoaming agent) | 2,4,7,9-tetramethyldecane-4,7-diol | 0.40 | 0.40 | 0.40 | 0.40 | 0.40 |
|  | 2,5,8,11-tetramethyldodecane-5,8-diol | — | — | — | — | — |
| pH regulator | 2-amino-2-ethyl-1,3-propanediol | 0.20 | 0.20 | 0.20 | 0.20 | 0.20 |
| Water | Pure water | balance | balance | balance | balance | balance |
|  | Total (% by mass) | 100 | 100 | 100 | 100 | 100 |

TABLE 3

|  | Ingredients | Production Example | | | | |
|---|---|---|---|---|---|---|
|  |  | 11 | 12 | 13 | 14 | 15 |
| Colorant | Surface-modified black pigment dispersed elements (1) (Preparation Example 1) | — | — | — | — | — |
|  | Surface-modified black pigment dispersed elements (2) (Preparation Example 2) | — | — | — | — | — |
|  | Surface-modified black pigment dispersed elements (3) (Preparation Example 3) | — | — | — | — | — |
|  | Surface-modified black pigment dispersed elements (4) (Preparation Example 4) | — | — | — | — | — |
|  | Surface-modified black pigment dispersed elements (5) (Preparation Example 5) | — | — | — | — | — |
|  | Surface-modified magenta pigment dispersed elements (1) (Preparation Example 6) | — | — | — | — | — |
|  | Surface-modified cyan pigment dispersed elements (1) (Preparation Example 7) | — | — | — | — | — |
|  | Surface-modified yellow pigment dispersed elements (1) (Preparation Example 8) | — | — | — | — | — |
|  | SENSIJET SMART Magenta 3122BA (Na aminobenzoate) | — | — | 35.00 | — | — |
|  | SENSIJET SMART Cyan 3154BA (Na aminobenzoate) | — | — | — | 22.50 | — |
|  | SENSIJET SMART Yellow 3074BA (Na aminobenzoate) | — | — | — | — | 22.50 |
|  | SENSIJET Black SDP2000 (Na carbonate and Na sulfonate) | — | 48.28 | — | — | — |
|  | Carbon black pigment-containing polymer particle dispersed elements (Preparation Example 9) | 46.67 | — | — | — | — |
| Resin | Acryl-silicone polymer particle dispersed elements (Preparation Example 10) | — | 5.00 | 5.00 | 5.00 | 5.00 |
|  | Fluororesin emulsion | — | — | — | — | — |
| Organic solvent | Structural Formula (I): 3-n-butoxy-N,N-dimethylpropaneamide (SP value: 9.03) | — | — | — | — | — |
|  | Structural Formula (IV): 3-ethyl-3-hydroxylmethyloxetane (SP value: 11.3) | 42.00 | 42.00 | 39.00 | 49.00 | 52.50 |
|  | 1,2-butanediol (SP value: 12.8) | — | — | — | — | — |
|  | 1,2-propanediol (SP value: 13.5) | — | — | — | — | — |
|  | Glycerin (SP value: 16.38) | — | — | — | — | — |
|  | Triethylene glycol (SP value: 15.4) | — | — | — | — | — |
|  | 2-ethyl-1,3-hexanediol (SP value: 10.6) | 2.00 | 2.00 | 2.00 | 2.00 | 2.00 |
|  | 2,2,4-trimethyl-1,3-pentanediol (SP value: 10.8) | — | — | — | — | — |
| Surfactant | Structural Formula (VII): polyether-modified siloxane compound | — | — | 2.00 | — | — |
|  | Structural Formula (IX): polyether-modified siloxane compound | — | — | — | 2.00 | — |
|  | Structural Formula (X): polyether-modified siloxane compound | — | — | — | — | 3.00 |
|  | TEGO Wet 270 | 2.00 | 2.00 | — | — | — |
|  | SILFACE SAG503A | — | — | — | — | — |
|  | UNIDYNE DSN403N | — | — | — | — | — |
|  | ZONYL FS-300 | — | — | — | — | — |
|  | SUFYNOL 104E | — | — | — | — | — |
|  | SOFTANOL EP-7025 | — | — | — | — | — |

TABLE 3-continued

|  | Ingredients | Production Example | | | | |
|---|---|---|---|---|---|---|
|  |  | 11 | 12 | 13 | 14 | 15 |
| Fungicide | Proxel GXL | 0.05 | 0.05 | 0.05 | 0.05 | 0.05 |
| Foam inhibitor (defoaming agent) | 2,4,7,9-tetramethyldecane-4,7-diol | — | — | 0.40 | 0.40 | 0.40 |
|  | 2,5,8,11-tetramethyldodecane-5,8-diol | 0.40 | 0.40 | — | — | — |
| pH regulator | 2-amino-2-ethyl-1,3-propanediol | 0.10 | 0.10 | 0.20 | 0.20 | 0.20 |
| Water | Pure water | balance | balance | balance | balance | balance |
|  | Total (% by mass) | 100 | 100 | 100 | 100 | 100 |

TABLE 4

|  | Ingredients | Production Example | | | | |
|---|---|---|---|---|---|---|
|  |  | 16 | 17 | 18 | 19 | 20 |
| Colorant | Surface-modified black pigment dispersed elements (1) (Preparation Example 1) | — | — | — | — | — |
|  | Surface-modified black pigment dispersed elements (2) (Preparation Example 2) | — | — | — | — | — |
|  | Surface-modified black pigment dispersed elements (3) (Preparation Example 3) | — | — | — | — | — |
|  | Surface-modified black pigment dispersed elements (4) (Preparation Example 4) | — | — | — | — | — |
|  | Surface-modified black pigment dispersed elements (5) (Preparation Example 5) | — | — | — | — | — |
|  | Surface-modified magenta pigment dispersed elements (1) (Preparation Example 6) | 35.00 | 35.00 | — | — | — |
|  | Surface-modified cyan pigment dispersed elements (1) (Preparation Example 7) | — | — | 22.50 | 22.50 | 22.50 |
|  | Surface-modified yellow pigment dispersed elements (1) (Preparation Example 8) | — | — | — | — | — |
|  | SENSIJET SMART Magenta 3122BA (Na aminobenzoate) | — | — | — | — | — |
|  | SENSIJET SMART Cyan 3154BA (Na aminobenzoate) | — | — | — | — | — |
|  | SENSIJET SMART Yellow 3074BA (Na aminobenzoate) | — | — | — | — | — |
|  | SENSIJET Black SDP2000 (Na carbonate and Na sulfonate) | — | — | — | — | — |
|  | Carbon black pigment-containing polymer particle dispersed elements (Preparation Example 9) | — | — | — | — | — |
| Resin | Acryl-silicone polymer particle dispersed elements (Preparation Example 10) | 5.00 | 5.00 | 5.00 | 5.00 | 5.00 |
|  | Fluororesin emulsion | — | — | — | — | — |
| Organic solvent | Structural Formula (I): 3-n-butoxy-N,N-dimethylpropaneamide (SP value: 9.03) | 15.00 | — | — | — | — |
|  | Structural Formula (IV): 3-ethyl-3-hydroxylmethyloxetane (SP value: 11.3) | — | — | 49.00 | 49.00 | 49.00 |
|  | 1,2-butanediol (SP value: 12.8) | 5.00 | — | — | — | — |
|  | 1,2-propanediol (SP value: 13.5) | — | — | — | — | — |
|  | Glycerin (SP value: 16.38) | 22.00 | 30.00 | — | — | — |
|  | Triethylene glycol (SP value: 15.4) | — | 12.50 | — | — | — |
|  | 2-ethyl-1,3-hexanediol (SP value: 10.6) | 2.00 | 2.00 | 2.00 | 2.00 | 2.00 |
|  | 2,2,4-trimethyl-1,3-pentanediol (SP value: 10.8) | — | — | — | — | — |
| Surfactant | Structural Formula (VII): polyether-modified siloxane compound | — | — | — | — | — |
|  | Structural Formula (IX): poryether-modified siloxane compound | — | — | 2.00 | 2.00 | 2.00 |
|  | Structural Formula (X): polyether-modified siloxane compound | — | — | — | — | — |
|  | TEGO Wet 270 | 2.00 | 2.00 | — | — | — |
|  | SILFACE SAG503A | — | — | — | — | — |
|  | UNIDYNE DSN403N | — | — | 2.00 | — | — |
|  | ZONYL FS-300 | — | — | — | 5.00 | — |
|  | SUFYNOL 104E | — | — | — | — | 2.00 |
|  | SOFTANOL EP-7025 | — | — | — | — | — |

TABLE 4-continued

|  | Ingredients | Production Example | | | | |
|---|---|---|---|---|---|---|
|  |  | 16 | 17 | 18 | 19 | 20 |
| Fungicide | Proxel GXL | 0.05 | 0.05 | 0.05 | 0.05 | 0.05 |
| Foam inhibitor (defoaming agent) | 2,4,7,9-tetramethyldecane-4,7-diol | 0.40 | 0.40 | 0.40 | 0.40 | 0.40 |
|  | 2,5,8,11-tetramethyldodecane-5,8-diol | — | — | — | — | — |
| pH regulator | 2-amino-2-ethyl-1,3-propanediol | 0.20 | 0.20 | 0.20 | 0.20 | 0.20 |
| Water | Pure water | balance | balance | balance | balance | balance |
|  | Total (% by mass) | 100 | 100 | 100 | 100 | 100 |

TABLE 5

|  | Ingredients | Pro. Ex. | |
|---|---|---|---|
|  |  | 21 | 22 |
| Colotant | Surface-modified black pigment dispersed elements (1) (Preparation Example 1) | — | — |
|  | Surface-modified black pigment dispersed elements (2) (Preparation Example 2) | — | — |
|  | Surface-modified black pigment dispersed elements (3) (Preparation Example 3) | — | 35.00 |
|  | Surface-modified black pigment dispersed elements (4) (Preparation Example 4) | — | — |
|  | Surface-modified black pigment dispersed elements (5) (Preparation Example 5) | — | — |
|  | Surface-modified magenta pigment dispersed elements (1) (Preparation Example 6) | — | — |
|  | Surface-modified cyan pigment dispersed elements (1) (Preparation Example 7) | 22.50 | — |
|  | Surface-modified yellow pigment dispersed elements (1) (Preparation Example 8) | — | — |
|  | SENSIJET SMART Magenta 3122BA (Na aminobenzoate) | — | — |
|  | SENSIJET SMART Cyan 3154BA (Na aminobenzoate) | — | — |
|  | SENSIJET SMART Yellow 3074BA (Na aminobenzoate) | — | — |
|  | SENSIJET Black SDP2000 (Na carbonate and Na sulfonate) | — | — |
|  | Carbon black pigment-containing polymer particle dispersed elements (Preparation Example 9) | — | — |
| Resin | Acryl-silicone polymer particle dispersed elements (Preparation Example 10) | 5.00 | 5.00 |
|  | Fluororesin emulsion | — | — |
| Organic solvent | Structural Formula (I): 3-n-butoxy-N,N-dimethylpropaneamide (SP value: 9.03) | — | — |
|  | Structural Formula (IV): 3-ethyl-3-hydroxylmethyloxetane (SP value: 11.3) | 49.00 | 42.00 |
|  | 1,2-butanediol (SP value: 12.8) | — | — |
|  | 1,2-propanediol (SP value: 13.5) | — | — |
|  | Glycerin (SP value: 16.38) | — | — |
|  | Triethylene glycol (SP value: 15.4) | — | — |
|  | 2-ethyl-1,3-hexanediol (SP value: 10.6) | 2.00 | 2.00 |
|  | 2,2,4-trimethyl-1,3-pentanediol (SP value: 10.8) | — | — |
| Surfactant | Structural Formula (VII): polyether-modified siloxane compound | — | — |
|  | Structural Formula (IX): polyether-modified siloxane compound | 2.00 | — |
|  | Structural Formula (X): polyether-modified siloxane compound | — | — |
|  | TEGO Wet 270 | — | — |
|  | SILFACE SAG503A | — | — |
|  | UNIDYNE DSN403N | — | 1.00 |
|  | ZONYL FS-300 | — | — |
|  | SUFYNOL 104E | — | — |
|  | SOFTANOL EP-7025 | 2.00 | — |

TABLE 5-continued

| | | Pro. Ex. | |
|---|---|---|---|
| | Ingredients | 21 | 22 |
| Fungicide | Proxel GXL | 0.05 | 0.05 |
| Foam inhibitor (defoaming agent) | 2,4,7,9-tetramethyldecane-4,7-diol | 0.40 | — |
| | 2,5,8,11-tetramethyldodecane-5,8-diol | — | 0.40 |
| pH regulator | 2-amino-2-ethyl-1,3-propanediol | 0.20 | 0.10 |
| Water | Pure water | balance | balance |
| | Total (% by mass) | 100 | 100 |

The abbreviations in Tables 1 to 5 represent as follows.

SENSIJET SMART Magenta 3122BA: available from Sensient Technologies Corporation (surface-treated pigment dispersion)

SENSIJET SMART Cyan 3154BA: available from Sensient Technologies Corporation (surface-treated pigment dispersion)

SENSIJET SMART Yellow 3074BA: available from Sensient Technologies Corporation (surface-treated pigment dispersion)

SENSIJET Black SDP2000: available from Sensient Technologies Corporation (surface-treated pigment dispersion)

Fluororesin emulsion: LUMIFLON FE4300 available from ASAHI GLASS CO., LTD., solid content: 50% by mass, average particle diameter: 150 nm, MFT: 30° C. or lower Organic solvent represented by Structural Formula (1) below

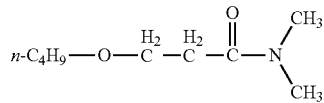

[Structural Formula (1), SP value: 9.03]

Organic solvent represented by Structural Formula (4) below

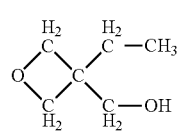

[Structural Formula (4), SP value: 11.3]

Polyether-modified siloxane compound represented by Structural Formula (VII) below

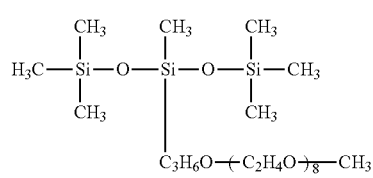

[Structural Formula (VII)]

Polyether-modified siloxane compound represented by Structural Formula (IX) below

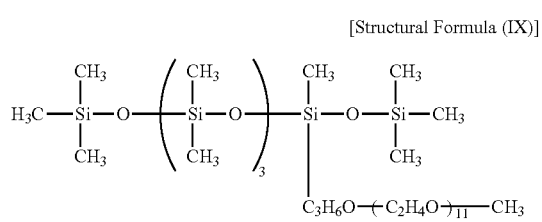

[Structural Formula (IX)]

Polyether-modified siloxane compound represented by Structural Formula (X)

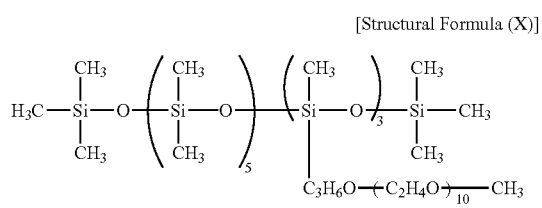

[Structural Formula (X)]

TEGO Wet270: polyether-modified siloxane compound (available from Evonik Industries AG, active ingredient: 100% by mass)

"TEGO Wet270" is a polyether-modified siloxane compound having a structure represented by General Formula (III).

SILFACE SAG503A: polyether-modified siloxane compound (available from Nissin Chemical Co., Ltd., active ingredient: 100% by mass)

"SILFACE SAG503A" is a polyether-modified siloxane compound having a structure represented by General Formula (V).

UNIDYNE DSN403N: polyoxyethylene perfluoroalkyl ether (available from DAIKIN INDUSTRIES, LTD., active ingredient: 100% by mass)

ZONYL FS-300: polyoxyethylene perfluoroalkyl ether (available from E.I. du Pont de Nemours and Company, active ingredient: 40% by mass)

SUFYNOL 104E: acetylene glycol compound (available from Nissin Chemical Co., Ltd., active ingredient: 100% by mass)

SOFTANOL EP-7025: higher alcohol ethoxylate compound (available from NIPPON SHOKUBAI CO., LTD., active ingredient: 100% by mass)

Proxel GXL: fungicide containing 1,2-benzisothiazolin-3-one as a main ingredient (available from Avecia, ingredient: 20% by mass, including dipropylene glycol)

Next, physical properties of each of the inks of Production Examples 1 to 22 were measured in the following manner. The results are presented in Table 6.

<Measurement of Viscosity>

The viscosity of the ink was measured at 25° C. by means of a viscometer (RE-550L, available from TOM SANGYO CO., LTD.).

<Measurement of pH>

The pH of the ink was measured at 25° C. by means of a pH meter (HM-30R, available from DKK-TOA CORPORATION).

<Dynamic Surface Tension>

As a dynamic surface tension of the ink of the present disclosure, a dynamic surface tension of the ink with a surface lifetime of 15 msec as measured by the maximum bubble pressure method was measured at 25° C. by means of SITA_DynoTester (available from SITA Messtechnik GmbH).

<Static Surface Tension>

A static surface tension of the ink was measured at 25° C. by means of an automatic surface tensiometer (DY-300, available from Kyowa Interface Science Co., Ltd.).

TABLE 6

| | Ink physical property values | | | | |
|---|---|---|---|---|---|
| | Viscosity (mPa·s) | pH | 15 msec Dynamic surface tension A (mN/m) | Static surface tension B (mN/m) | $[(A-B)/(A+B)] \times 100$ |
| Pro. Ex. 1 | 8.2 | 9.5 | 33.2 | 24.3 | 15.5% |
| Pro. Ex. 2 | 8.5 | 9.6 | 31.7 | 22.9 | 16.1% |
| Pro. Ex. 3 | 8.6 | 9.7 | 32.9 | 23.9 | 15.8% |
| Pro. Ex. 4 | 8.4 | 9.7 | 29.7 | 22.1 | 14.7% |
| Pro. Ex. 5 | 8.0 | 9.4 | 33.3 | 26.8 | 10.8% |
| Pro. Ex. 6 | 8.7 | 9.7 | 28.9 | 21.5 | 14.7% |
| Pro. Ex. 7 | 8.5 | 9.7 | 32.3 | 22.6 | 17.7% |
| Pro. Ex. 8 | 8.2 | 9.5 | 29.0 | 21.6 | 14.6% |
| Pro. Ex. 9 | 7.8 | 9.2 | 27.5 | 20.8 | 13.9% |
| Pro. Ex. 10 | 7.9 | 9.5 | 32.4 | 26.1 | 10.8% |
| Pro. Ex. 11 | 9.3 | 9.6 | 32.3 | 23.3 | 16.2% |
| Pro. Ex. 12 | 8.3 | 9.5 | 30.1 | 22.5 | 14.4% |
| Pro. Ex. 13 | 9.6 | 9.4 | 32.9 | 23.2 | 17.3% |
| Pro. Ex. 14 | 9.3 | 9.6 | 29.7 | 22.6 | 13.6% |
| Pro. Ex. 15 | 8.9 | 9.5 | 28.4 | 22.9 | 10.7% |
| Pro. Ex. 16 | 8.7 | 9.3 | 31.8 | 22.7 | 16.7% |
| Pro. Ex. 17 | 8.8 | 9.4 | 32.0 | 23.1 | 16.2% |
| Pro. Ex. 18 | 8.4 | 9.0 | 28.8 | 19.5 | 19.3% |
| Pro. Ex. 19 | 8.3 | 9.1 | 35.1 | 22.5 | 21.9% |
| Pro. Ex. 20 | 8.1 | 9.4 | 34.8 | 29.5 | 8.2% |
| Pro. Ex. 21 | 8.2 | 9.4 | 37.9 | 30.6 | 10.7% |
| Pro. Ex. 22 | 8.9 | 9.2 | 29.7 | 19.8 | 20.0% |

Production Example 101

<Production of Nozzle Plate A>

<<Synthesis of Fluorine-Containing Acrylate Polymer A>>

—Synthesis of Ethylene Oxide Chain-Containing Fluoro Monomer (MPOERfA)—

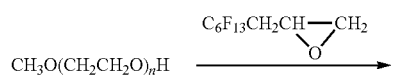

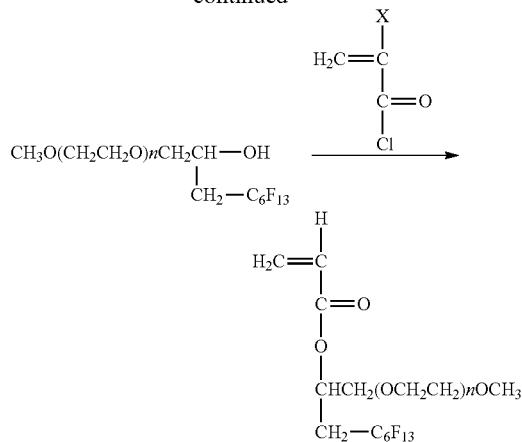

In the reaction formula, the average of n is from 8 through 9.

Next, a four-necked flask was charged with 52.13 g of polyethylene glycol having a methoxy group at one terminal (average number of EO: 8 through 9, UNIOX M-400, available from NOF CORPORATION) and 0.94 g of a boron trifluoride diethyl ether complex. Under a nitrogen gas flow, 50 g of 3-perfluorohexyl-1,2-epoxypropane was dripped in the flask over from 30 minutes through 40 minutes at room temperature with paying close attention to generation of heat. After the completion of the dripping, the mixture was allowed to react for about 2 hours at room temperature, followed by confirming that a peak of 3-perfluorohexyl-1,2-epoxypropane was disappeared by gas chromatography (GC). To the reaction mixture, 0.03 g of tertiary butyl catechol was added, and the resultant mixture was sufficiently stirred. Moreover, 14.81 g of triethyl amine was added to the mixture, and 12.04 g of acrylic acid chloride was dripped to the mixture over about 20 minutes with paying close attention to generation of heat. After the completion of the dripping, the mixture was allowed to react for about 2 hours at room temperature, followed by confirming that a peak of acrylic acid chloride was almost disappeared by gas chromatography (GC). The determination of the generated product was performed with IR spectrum, $^1$H-NMR, and $^{19}$F-NMR spectrums.

—Synthesis of Fluorine-Containing Acrylate Polymer A—

A 200 mL four-necked flask was charged with 60 g of isopropyl alcohol, relative to a monomer composition including 10% by mass of the synthesized MPOERfA monomer, 60% by mass of 2-(perfluorohexyl)ethylacrylate, 20% by mass of polyethylene glycol monoacrylate (EO: 10 mol, AE-400, available from NOF CORPORATION), 5% by mass of 2-hydroxyethylacrylate, 2.5% by mass of acetoacetoxyethyl methacrylate and 2.5% by mass of dimethylaminoethyl acrylate, and the air inside the system was replaced with nitrogen by blowing nitrogen gas for 60 minutes. With continuous supply of a nitrogen glow, the internal temperature of the system was heated to the range of from 75° C. through 80° C., then 0.25 g of azobisisobutyronitrile was added, and the resultant was allowed to react through a polymerization reaction for 8 hours. The polymerization liquid was analyzed by gas chromatography (GC) and gel permeation chromatography. As a result, it was confirmed that a peak derived from the monomer was almost disappeared and a peak derived from a copolymer was generated. Moreover, a weight average molecular weight of the copolymer was 17,000 (polystyrene conversion). Finally, 0.42 g of acetic acid was added to neutralize, followed by diluting with water to form a 20% by mass fluorine-containing acrylate copolymer A solution.

—Production of Nozzle Plate—

A nozzle substrate formed of stainless steel (SUS304) having a length of 34 mm, a width of 16 mm, and an average thickness of 20 µm. Note that, in the nozzle substrate, 4 lines of nozzle hole arrays were formed. In each nozzle hole array, 320 nozzle holes having an average pore diameter of 25 µm were aligned at a pitch of 85 µm (300 dpi), where the pitch was the minimum distance between centers of the two adjacent nozzle holes.

The produced 20% by mass fluorine-containing acrylate polymer A solution was applied onto a surface of the nozzle substrate at the side where an ink was to be ejected through dip coating, followed by drying, to thereby form an ink-repellent film having an average thickness of 50 nm. As described above, a nozzle plate A of Production Example 101 was produced. During the production of the nozzle plate A, the nozzle holes were masked with a water-soluble resin, or a back side of the nozzle substrate was masked with a tape, and the water-soluble resin or the tape was removed after forming the ink-repellent film. Moreover, the ink-repellent film was formed by heating for 1 hour at 120° C.

Production Example 102

<Production of Nozzle Plate B>
<<Synthesis of Fluorine-Containing Acrylate Polymer B>>
—Synthesis of Rf Epoxy Adduct of 2-Hydroxyethylacrylate (HEA) (FAGMA)—

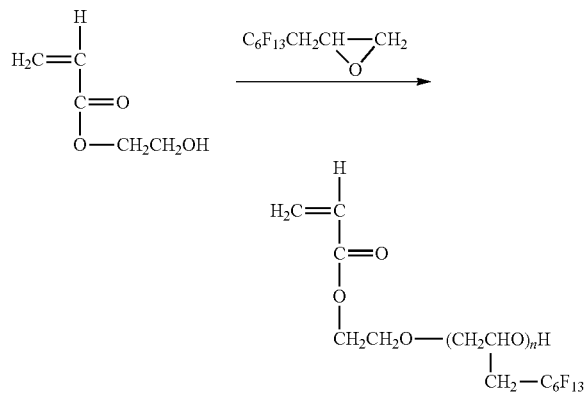

A four-necked flask was charged with 20 g of 2-hydroxyethylacrylate (HEA), 0.61 g of a boron trifluoride diethyl ether complex, and 0.026 g of tertiary butyl catechol. At room temperature, 64.83 g of 3-perfluorohexyl-1,2-epoxypropane was dripped in the flask over from 30 minutes through 40 minutes with paying close attention to generation of heat. After the completion of the dripping, the mixture was allowed to react for about 2 hours at room temperature, followed by confirming that a peak of 3-perfluorohexyl-1, 2-epoxypropane was disappeared by gas chromatography (GC). After the completion of the reaction, the reaction product was dissolved in 100 g of 1,1-dichloro-1,2,2,3,3-pentafluoropropane (HCFC225), and 100 g of water was further added to the solution to wash and separate with a separating funnel to collect an organic layer. A process of the washing and separating was repeated once more to collect an organic layer, followed by adding 5 g of anhydrous magnesium sulfate to dry overnight. HCFC225 was then evaporated to obtain an Rf epoxy adduct of HEA (FAGMA). The determination of the generated product was performed with IR spectrum, $^1$H-NMR, and $^{19}$F-NMR spectrums. It was found from the analysis results of the generated product that a monomer mixture including about 64% by mass of a 1 mol adduct (n=1) of 3-perfluorohexyl-1,2-epoxypropane, about 27% by mass of a 2 mol adduct (n=2) of 3-perfluorohexyl-1,2-epoxypropane, and about 9% by mass of a 3 mol adduct (n=3) of 3-perfluorohexyl-1,2-epoxypropane was obtained.

—Synthesis of Sulfonic Acid-Containing Fluoro Monomer—

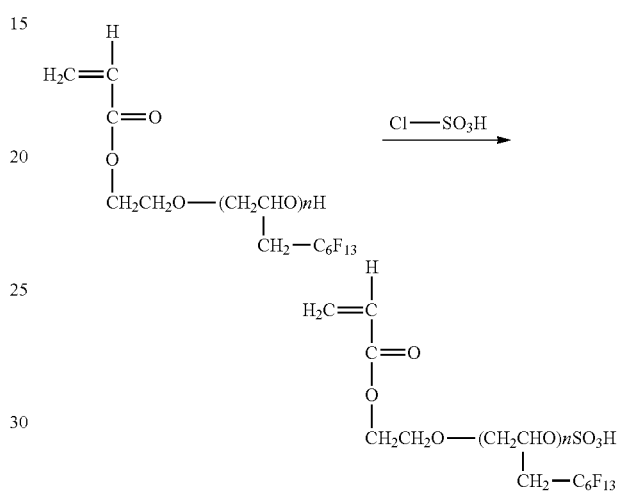

A four-necked flask was charged with 30 g of the synthesized Rf epoxy adduct of HEA (FAGMA), 30 g of dichloromethane, 7.8 g of triethyl amine, and 0.024 g of hydroquinone monomethyl ether. The resultant mixed solution was cooled in an ice bath to the range of from 0° C. through 10° C. Into the mixed solution, a dichloromethane solution of chlorosulfonic acid (7.48 g of chlorosulfonic acid and 15 g of dichloromethane) was gradually dripped over about 30 minutes with paying close attention to generation of heat. After the completion of the dripping, the mixture was allowed to react for about 3 hours at room temperature. To the reaction product, 100 g of water was added, and a process of washing and separation of a liquid was repeated twice. The resultant organic layer was collected, and 5 g of anhydrous magnesium sulfate was added to the organic layer to dry overnight. The determination of the generated product (sulfonic acid-containing fluoro monomer) was performed with IR spectrum, $^1$H-NMR, and $^{19}$F-NMR spectrums.

—Synthesis of Fluorine-Containing Acrylate Polymer B—

A fluorine-containing acrylate polymer B was synthesized in the same manner as in Production Example 101, the monomer composition was replaced with a monomer composition including 60% by mass of 2-(perfluorohexyl)ethylacrylate, 20% by mass of the sulfonic acid group-containing fluoro monomer, 17.5% by mass of polyethylene glycol monoacrylate (EO: 10 mol, AE-400, available from NOF CORPORATION), and 2.5% by mass of acetoacetoxyethyl methacrylate. A weight average molecular weight of the obtained copolymer was 17,000 (polystyrene conversion). Finally, 0.42 g of acetic acid was added to neutralize, followed by diluting with water to form a 20% by mass fluorine-containing acrylate copolymer B solution.

—Production of Nozzle Plate—

The produced 20% by mass fluorine-containing acrylate polymer A solution was applied onto a surface of a nozzle substrate identical to the substrate of Production Example 101 at the side where an ink was to be ejected through clip coating, followed by drying, to thereby form an ink-repellent film having an average thickness of 30 nm. As described above, a nozzle plate B of Production Example 102 was produced. During the production of the nozzle plate B, the nozzle holes were masked with a water-soluble resin, or a back side of the nozzle substrate was masked with a tape, and the water-soluble resin or the tape was removed after forming the ink-repellent film. Moreover, the ink-repellent film was formed by heating for 1 hour at 120° C.

Production Example 103

<Production of Nozzle Plate C>

A fluorine-containing acrylate polymer solution (OP-TOOL DSX, available from DAIKIN INDUSTRIES, LTD.) was provided.

The fluorine-containing acrylate polymer solution (OP-TOOL DSX, available from DAIKIN INDUSTRIES, LTD.) was applied onto a surface of a nozzle substrate identical to the substrate of Production Example 101 at the side where an ink was to be ejected through dip coating, followed by drying, to thereby form an ink-repellent film having an average thickness of 20 nm. As described above, a nozzle plate C of Production Example 103 was produced. During the production of the nozzle plate C, the nozzle holes were masked with a water-soluble resin, or a back side of the nozzle substrate was masked with a tape, and the water-soluble resin or the tape was removed after forming the ink-repellent film. Moreover, the ink-repellent film was formed by heating for 1 hour at 120° C.

Production Example 104

<Production of Nozzle Plate D>

A silicone resin solution (SR 2441 RESIN, available from Dow Corning Toray Co., Ltd.).

The silicone resin solution was applied onto a surface of a nozzle substrate identical to the substrate of Production Example 101 at the side where an ink was to be ejected through dip coating, followed by drying, to thereby form an ink-repellent film having an average thickness of 100 nm. As described above, a nozzle plate D of Production Example 104 was produced. During the production of the nozzle plate D, the nozzle holes were masked with a water-soluble resin, or a back side of the nozzle substrate was masked with a tape, and the water-soluble resin or the tape was removed after forming the ink-repellent film. Moreover, the ink-repellent film was formed by heating for 2 hours at 150° C.

Production Example 105

<Production of Nozzle Plate E>

As an ink-repellent processing agent, used was a 0.2% by mass diluted solution of CYTOP CTX-105 (product name, available from ASAHI GLASS CO., LTD.) with a liquid in which CT-solv.100 (available from ASAHI GLASS CO., LTD.) and CT-solv.180 (available from ASAHI GLASS CO., LTD.) were mixed at a volume ratio of 1:1.

Silicone rubber was placed on a spinner, and 2 mL of the diluted solution was dripped on the silicone rubber. After the dripping, the diluted solution was spun on the spinner to form a homogeneous film. The rotational speed of the spinner was set at 1,000 rpm for 5 seconds for the first spinning, and at 3,000 rpm for 20 seconds for the second spinning.

A surface of the nozzle substrate identical to the nozzle substrate of Example 1 was pressed against the silicone rubber to perform transfer. The transfer was performed 3 times, and press pressure was 2 kg/head.

After completing the transfer, the head itself was placed in an oven at 150° C. for two and a half hours to perform a heat treatment, to thereby produce a nozzle plate E of Production Example 105.

Production Example 106

<Production of Nozzle Plate F>

As an ink-repellent processing agent, used was a 0.5% by mass diluted solution of AF1600 (product name) (TEFLON (registered trademark) AF, available from E.I. du Pont de Nemours and Company) with FLUORINERT FC-75 (product name, available from 3M COMPANY).

In the same manner as in Production Example 105, silicone rubber was placed on a spinner, and 2 mL of the diluted solution was dripped on the silicone rubber. After the dripping, the diluted solution was spun on the spinner to form a homogeneous film. The rotational speed of the spinner was set at 1,000 rpm for 5 seconds for the first spinning, and at 3,000 rpm for 20 seconds for the second spinning.

A surface of the nozzle substrate identical to the nozzle substrate of Example 1 was pressed against the silicone rubber to perform transfer. The transfer was performed 3 times, and press pressure was 2 kg/head.

After completing the transfer, the head itself was placed in an oven at 165° C. for 2 hours and 30 minutes to perform a heat treatment, to thereby produce a nozzle plate F of Production Example 106.

Examples 1 to 17 and Comparative Examples 1 to 7

—Image Formation—

In the environment adjusted to 23° C.±0.5° C. and 50%±5% RH, an image forming device (IPSiO GXe-5500, available from Ricoh Company Limited) was used and set to deposit an ink in an identical deposition amount on OK TOPCOAT+, available from Oji Paper Co., Ltd. (basis weight: 104.7 g/m$^2$) serving as a printing medium with varying driving voltage of a piezo element to make an ejection amount of the ink identical.

The image forming device (IPSiO GXe-5500, available from Ricoh Company Limited) was modified by replacing a nozzle plate mounted in the image forming device as a standard equipment with any of the nozzle plates A to F, and image formation was performed under the above-described conditions with a combination of the nozzle plate and the ink presented in Table 7.

Various properties were evaluated on Examples 1 to 17 and Comparative Example 1 to 7 in the following manner. The results are presented in Table 7.

<Image Density>

A chart including a 64 point-letter "black square" formed by Word 2000 available from Microsoft Corporation was printed on MyPaper (available from Ricoh Company Limited) serving as a printing medium, and the area of "black square" on the printed surface was measured by a spectrophotometer (X-Rite939, available from X-Rite Inc.) and evaluated based on the following evaluation criteria. A modified mode where the "plain paper-standard fast" mode in the user setting for plain paper was changed to "no color correction" by the driver attached to the printer was used as the printing mode.

Note that, "black square" mentioned above is a latter (symbol) where a square is filled in black, but it is described as "black square" since use of a symbol is not permitted for formality reasons.

[Evaluation Criteria]
A: Black was 1.25 or greater, Yellow was 0.8 or greater, Magenta was 1.00 or greater, and Cyan was 1.05 or greater.
B: Black was 1.20 or greater but less than 1.25, Yellow was 0.75 or greater but less than 0.8, Magenta was 0.95 or greater but less than 1.00, and Cyan was 1.0 or greater but less than 1.05.
C: Black was 1.15 or greater but less than 1.20, Yellow was 0.70 or greater but less than 0.75, Magenta was 0.90 or greater but less than 0.95, and Cyan was 0.95 or greater but less than 1.00.
D: Black was less than 1.15, Yellow was less than 0.70, Magenta was less than 0.90, and Cyan was less than 0.95.

<Beading>

A solid image was printed in the same manner as in the evaluation of the image density, except that the printing medium was replaced with OK TOPCOAT+ (basis weight: 104.7 g/m$^2$) available from Oji Paper Co., Ltd., and a modified mode where the "gloss paper-high quality" mode was changed to "no color correction" by the driver attached to the printer was used as the printing mode. Unevenness of the density (beading) of the solid image was visually observed, and evaluated based on the following evaluation criteria.

[Evaluation Criteria]
A: No beading at all
B: Slight beading
C: Some beading
D: Significant beading Since the black solid image was extremely difficult to observe with naked eyes, the black solid image was observed under an optical microscope with a magnification of 40 times.

<Evaluation of Intermittent Ejection Stability>

A chart filled with solid images each having an area that was 5% of an A4 size sheet per color formed by Word 2000 available from Microsoft Corporation was continuously printed on 200 sheets of MyPaper (available from Ricoh Company Limited), and the intermittent ejection stability was evaluated from disturbance in the ejection from each nozzle after the printing based on the following criteria. A modified mode where the "plain paper-standard fast" mode in the user setting for plain paper was changed to "no color correction" by the driver attached to the printer was used as the printing mode.

[Evaluation Criteria]
A: There was not disturbance in ejection.
B: Slight disturbance in ejection was observed.
C: Disturbance in ejection or an area from which ejection could not be performed was observed.

<Evaluation of Ink Repellent Time of Nozzle Plate>

In the environment where a temperature was controlled at 23° C.±0.5° C., and relative humidity was controlled to 50%±5%, 50 g of each ink presented in Table 7 was placed in a 50 mL beaker, the nozzle plate was taken out from the image forming device (IPSiO GXe-5500, available from Ricoh Company Limited) and pitched up with tweezers. The nozzle plate was dipped in the ink at the speed of 315 mm/min and taken out at the same speed. The ink repellent time (ink withdrawing time) from the ink-repellent film of the nozzle plate was measured and evaluated based on the following criteria.

[Evaluation Criteria]
A: The ink repellent time was shorter than 10 seconds.
B: The ink repellent time was 10 seconds or longer but shorter than 30 seconds.
C: The ink repellent time was 30 seconds or longer but shorter than 60 seconds.
D: The ink repellent time was 60 seconds or longer.

If the ink repellent time is long, the nozzle plate tends to be wet with the ink, and therefore an ejection failure due to ink depositions on the nozzle tends to occur in the continuous ejection evaluation.

<Receding Contact Angle>

On a surface of the nozzle plate taken out from the image forming device (IPSiO GXe-5500, available from Ricoh Company Limited), 2.5 µL of each ink presented in Table 7 was pushed out from a syringe equipped with a syringe needle having an internal diameter of 0.37 µm in the environment of 25° C., and a receding contact angle (°) was measured at 25° C. by means of an automatic contact angle measuring device (DSA25, available from KRUSS GmbH) by a contraction method.

TABLE 7

| | Ink | Nozzle plate | Ink repellent time | Receding contact angle (°) | Image density | Beading | Intermittent ejection stability |
|---|---|---|---|---|---|---|---|
| Ex. 1 | Production Ex. 1 | Nozzle plate A | A | 59 | B | B | A |
| Ex. 2 | Production Ex. 2 | Nozzle plate B | A | 50 | A | A | A |
| Ex. 3 | Production Ex. 3 | Nozzle plate C | A | 56 | A | A | A |
| Ex. 4 | Production Ex. 4 | Nozzle plate A | A | 48 | A | A | A |
| Ex. 5 | Production Ex. 5 | Nozzle plate D | A | 49 | B | B | A |
| Ex. 6 | Production Ex. 6 | Nozzle plate C | B | 44 | A | A | A |
| Ex. 7 | Production Ex. 7 | Nozzle plate A | A | 47 | A | A | A |
| Ex. 8 | Production Ex. 8 | Nozzle plate B | A | 42 | A | A | A |
| Ex. 9 | Production Ex. 9 | Nozzle plate C | B | 37 | A | A | A |

TABLE 7-continued

|  | Ink | Nozzle plate | Ink repellent time | Receding contact angle (°) | Image density | Beading | Intermittent ejection stability |
|---|---|---|---|---|---|---|---|
| Ex. 10 | Production Ex. 10 | Nozzle plate D | A | 43 | A | A | A |
| Ex. 11 | Production Ex. 11 | Nozzle plate C | A | 54 | B | B | B |
| Ex. 12 | Production Ex. 12 | Nozzle plate C | A | 51 | A | B | B |
| Ex. 13 | Production Ex. 13 | Nozzle plate C | A | 52 | A | B | B |
| Ex. 14 | Production Ex. 14 | Nozzle plate C | A | 46 | A | A | B |
| Ex. 15 | Production Ex. 15 | Nozzle plate C | B | 48 | A | A | B |
| Ex. 16 | Production Ex. 4 | Nozzle plate E | A | 40 | A | A | A |
| Ex. 17 | Production Ex. 5 | Nozzle plate F | A | 53 | B | B | A |
| Comp. Ex. 1 | Production Ex. 16 | Nozzle plate D | D | 32 | B | C | B |
| Comp. Ex. 2 | Production Ex. 17 | Nozzle plate D | D | 34 | B | D | B |
| Comp. Ex. 3 | Production Ex. 18 | Nozzle plate A | D | 30 | A | A | C |
| Comp. Ex. 4 | Production Ex. 19 | Nozzle plate C | D | 34 | B | C | C |
| Comp. Ex. 5 | Production Ex. 20 | Nozzle plate D | B | 49 | B | D | C |
| Comp. Ex. 6 | Production Ex. 21 | Nozzle plate B | A | 64 | C | D | C |
| Comp. Ex. 7 | Production Ex. 22 | Nozzle plate D | D | 29 | A | B | C |

For example, embodiments of the present disclosure are as follows.

<1> A printing device including
an inkjet head including a nozzle plate, where the printing device is configured to eject an ink from the inkjet head and the ink includes a colorant, at least one organic solvent, and water,
wherein a dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $10.0\% \leq [(A-B)/(A+B)] \times 100 \leq 19.0\%$, and wherein a receding contact angle of the ink relative to the nozzle plate is 35° or greater.

<2> The printing device according to <1>,
wherein the dynamic surface tension A of the ink at 25° C. with a surface lifetime of 15 msec as measured by the maximum bubble pressure method is 30.0 mN/m or less, and the dynamic surface tension A and the static surface tension B of the ink at 25° C. satisfy a formula below, $12.0\% \leq [(A-B)/(A+B)] \times 100 \leq 17.0\%$.

<3> The printing device according to <1> or <2>,
wherein the static surface tension B of the ink at 25° C. is 20.0 mN/m or greater but 30.0 mN/m or less.

<4> The printing device according to any one of <1> to <3>,
wherein the receding contact angle of the ink relative to the nozzle plate is 35° or greater but 80° or less.

<5> The printing device according to any one of <1> to <4>,
wherein the at least one organic solvent includes an organic solvent having a solubility parameter of 9 or greater but less than 11.8.

<6> The printing device according to <5>,
wherein the organic solvent having a solubility parameter of 9 or greater but less than 11.8 is at least one selected from the group consisting of compounds represented by General Formula (I) and General Formula (II) below,

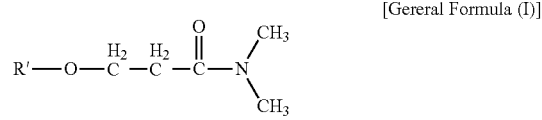

[Gereral Formula (I)]

where, in General Formula (I), R' is an alkyl group containing from 4 through 6 carbon atoms,

[General Formula (II)]

where, in General Formula (II), R" is an alkyl group containing from 1 through 2 carbon atoms.

<7> The printing device according to any one of <1> to <6>,
wherein the colorant is a water-dispersible pigment including a hydrophilic functional group on a surface of the pigment, and the hydrophilic functional group is a quaternary ammonium salt.

<8> The printing device according to any one of <1> to <7>,
wherein the ink further includes a surfactant which is a polyether-modified siloxane compound.

<9> The printing device according to any one of <1> to <8>, wherein an ink-repellent film of the nozzle plate includes a fluorine-containing acrylate polymer.

<10> The printing device according to <9>, wherein the fluorine-containing acrylate polymer includes a monomer unit which is at least one selected from the group consisting of a compound represented by General Formula (III) below and a compound represented by General Formula (IV) below,

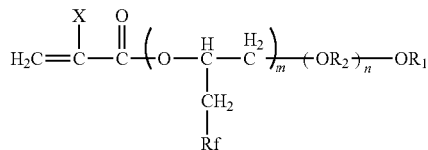
[General Formula (III)]

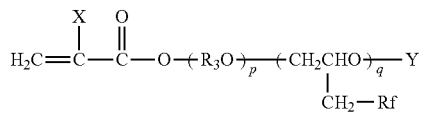
[General Formula (IV)]

where, in General Formulae (III) and (IV), X is a hydrogen atom, a straight-chain or branched-chain alkyl group containing from 1 through 21 carbon atoms, a halogen atom, $CFX_1X_2$ group (where $X_1$ and $X_2$ are each independently a hydrogen atom or a halogen atom), a cyano group, a straight-chain or branched-chain fluoroalkyl group containing from 1 through 21 carbon atoms, a substituted or unsubstituted benzyl group, or a substituted or unsubstituted phenyl group;

$R_1$ is an alkyl group containing from 1 through 18 carbon atoms; $R_2$ is an alkylene group containing from 2 through 6 carbon atoms; $R_3$ is an alkylene group containing from 2 through 6 carbon atoms; Y is an acid group; Rf is a straight-chain or branched-chain fluoroalkyl group containing from 1 through 21 carbon atoms;

m is from 1 through 10; n is from 2 through 90; p is from 1 through 90; and q is from 1 through 10.

<11> The printing device any one of <1> to <8>, wherein an ink-repellent film of the nozzle plate includes a polymer including a fluorine-containing heterocyclic structure in a main chain of the polymer.

<12> A printing method including
ejecting an ink from an inkjet head including a nozzle plate, where the ink includes a colorant, at least one organic solvent, and water,
wherein a dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $10.0\% \leq [(A-B)/(A+B)] \times 100 \leq 19.0\%$, and wherein a receding contact angle of the ink relative to the nozzle plate is 35° or greater.

<13> The printing method according to <12>, wherein the dynamic surface tension A of the ink at 25° C. with a surface lifetime of 15 msec as measured by the maximum bubble pressure method is 30.0 mN/m or less, and the dynamic surface tension A and the static surface tension B of the ink at 25° C. satisfy a formula below, $12.0\% \leq [(A-B)/(A+B)] \times 100 \leq 17.0\%$.

<14> The printing method according to <12> or <13>, wherein the static surface tension B of the ink at 25° C. is 20.0 mN/m or greater but 30.0 mN/m or less.

<15> The printing method according to any one of <12> to <14>, wherein the receding contact angle of the ink relative to the nozzle plate is 35° or greater but 80° or less.

<16> The printing method according to any one of <12> to <15>, wherein the at least one organic solvent includes an organic solvent having a solubility parameter of 9 or greater but less than 11.8.

<17> The printing method according to <16>, wherein the organic solvent having a solubility parameter of 9 or greater but less than 11.8 is at least one selected from the group consisting of compounds represented by General Formula (I) and General Formula (II) below,

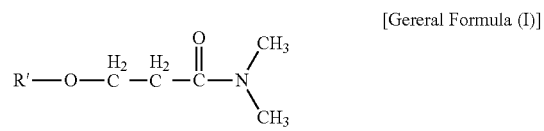
[General Formula (I)]

where, in General Formula (I), R' is an alkyl group containing from 4 through 6 carbon atoms,

[General Formula (II)]

where, in General Formula (II), R" is an alkyl group containing from 1 through 2 carbon atoms.

<18> The printing method according to any one of <12> to <17>, wherein the colorant is a water-dispersible pigment including a hydrophilic functional group on a surface of the pigment, and the hydrophilic functional group is a quaternary ammonium salt.

<19> The printing method according to any one of <12> to <18>, wherein the ink further includes a surfactant which is a polyether-modified siloxane compound.

<20> The printing method according to any one of <12> to <19>, wherein an ink-repellent film of the nozzle plate includes a fluorine-containing acrylate polymer.

<21> The printing method according to <20>, wherein the fluorine-containing acrylate polymer includes a monomer unit which is at least one selected from the group consisting of a compound represented by General Formula (III) below and a compound represented by General Formula (IV) below,

[General Formula (III)]

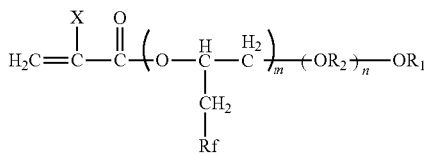

[General Formula (IV)]

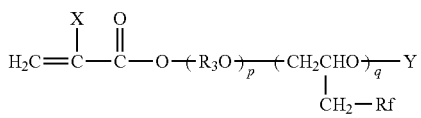

where, in General Formulae (III) and (IV), X is a hydrogen atom, a straight-chain or branched-chain alkyl group containing from 1 through 21 carbon atoms, a halogen atom, $CFX_1X_2$ group (where $X_1$ and $X_2$ are each independently a hydrogen atom or a halogen atom), a cyano group, a straight-chain or branched-chain fluoroalkyl group containing from 1 through 21 carbon atoms, a substituted or unsubstituted benzyl group, or a substituted or unsubstituted phenyl group;

$R_1$ is an alkyl group containing from 1 through 18 carbon atoms; $R_2$ is an alkylene group containing from 2 through 6 carbon atoms; $R_3$ is an alkylene group containing from 2 through 6 carbon atoms; Y is an acid group; Rf is a straight-chain or branched-chain fluoroalkyl group containing from 1 through 21 carbon atoms;

m is from 1 through 10; n is from 2 through 90; p is from 1 through 90; and q is from 1 through 10.

<22> The printing method according to any one of <12> to <19>, wherein an ink-repellent film of the nozzle plate includes a polymer including a fluorine-containing heterocyclic structure in a main chain of the polymer.

The printing device according to any one of <1> to <11> and the printing method according to any one of <12> to <22> can solve the above-described various problems in the art and can achieve the above-described object of the present disclosure.

What is claimed is:

1. A printing device comprising
an inkjet head including a nozzle plate, where the printing device is configured to eject an ink from the inkjet head and the ink includes a colorant, at least one organic solvent, and water,
wherein a dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $10.0\% \leq [(A-B)/(A+B)] \times 100 \leq 19.0\%$, and wherein a receding contact angle of the ink relative to the nozzle plate is 35° or greater.

2. The printing device according to claim 1,
wherein the dynamic surface tension A of the ink at 25° C. with a surface lifetime of 15 msec as measured by the maximum bubble pressure method is 30.0 mN/m or less, and the dynamic surface tension A and the static surface tension B of the ink at 25° C. satisfy a formula below, $12.0\% \leq [(A-B)/(A+B)] \times 100 \leq 17.0\%$.

3. The printing device according to claim 1,
wherein the static surface tension B of the ink at 25° C. is 20.0 mN/m or greater but 30.0 mN/m or less.

4. The printing device according to claim 1,
wherein the at least one organic solvent includes at least one organic solvent having a solubility parameter of 9 or greater but less than 11.8.

5. The printing device according to claim 4,
wherein the organic solvent having a solubility parameter of 9 or greater but less than 11.8 is at least one selected from the group consisting of compounds represented by General Formula (I) and General Formula (II) below,

[General Formula (I)]

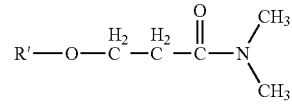

where, in General Formula (I), R' is an alkyl group containing from 4 through 6 carbon atoms,

[General Formula (II)]

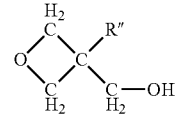

where, in General Formula (II), R" is an alkyl group containing from 1 through 2 carbon atoms.

6. The printing device according to claim 1,
wherein the colorant is a water-dispersible pigment including a hydrophilic functional group on a surface of the pigment, and the hydrophilic functional group is a quaternary ammonium salt.

7. The printing device according to claim 1,
wherein the ink further includes a surfactant which is a polyether-modified siloxane compound.

8. The printing device according to claim 1,
wherein an ink-repellent film of the nozzle plate includes a fluorine-containing acrylate polymer.

9. The printing device according to claim 8,
wherein the fluorine-containing acrylate polymer includes a monomer unit which is at least one selected from the group consisting of a compound represented by General Formula (III) below and a compound represented by General Formula (IV) below,

[General Formula (III)]

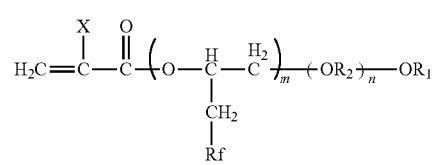

[General Formula (IV)]

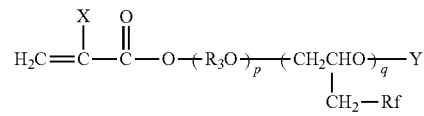

where, in General Formulae (III) and (IV), X is a hydrogen atom, a straight-chain or branched-chain alkyl group containing from 1 through 21 carbon atoms, a halogen atom, $CFX_1X_2$ group (where $X_1$ and $X_2$ are each independently a hydrogen atom or a halogen atom), a cyano group, a straight-chain or branched-chain fluoroalkyl group containing from 1 through 21 carbon atoms, a substituted or unsubstituted benzyl group, or a substituted or unsubstituted phenyl group;

$R_1$ is an alkyl group containing from 1 through 18 carbon atoms; $R_2$ is an alkylene group containing from 2 through 6 carbon atoms; $R_3$ is an alkylene group containing from 2 through 6 carbon atoms; Y is an acid group; Rf is a straight-chain or branched-chain fluoroalkyl group containing from 1 through 21 carbon atoms;

m is from 1 through 10; n is from 2 through 90; p is from 1 through 90; and q is from 1 through 10.

10. The printing device according to claim 1,
wherein an ink-repellent film of the nozzle plate includes a polymer including a fluorine-containing heterocyclic structure in a main chain of the polymer.

11. A printing method comprising
ejecting an ink from an inkjet head including a nozzle plate, where the ink includes a colorant, at least one organic solvent, and water,
wherein a dynamic surface tension A of the ink at 25° C. with a surface lifetime of 15 msec as measured by a maximum bubble pressure method is 34.0 mN/m or less, and the dynamic surface tension A and a static surface tension B of the ink at 25° C. satisfy a formula below, $$10.0\% \leq [(A-B)/(A+B)] \times 100 \leq 19.0\%, \text{ and}$$

wherein a receding contact angle of the ink relative to the nozzle plate is 35° or greater.

* * * * *